US 7,954,445 B2
Jun. 7, 2011

(12) United States Patent
Satoh

(10) Patent No.: US 7,954,445 B2
(45) Date of Patent: Jun. 7, 2011

(54) PRESSURE STATE INDICATOR

(75) Inventor: Hiroshi Satoh, Tokyo (JP)

(73) Assignee: Koganei Corporation, Tokyo (JP)

(*) Notice: Subject to any disclaimer, the term of this patent is extended or adjusted under 35 U.S.C. 154(b) by 647 days.

(21) Appl. No.: 11/917,916

(22) PCT Filed: Jun. 21, 2006

(86) PCT No.: PCT/JP2006/312389
§ 371 (c)(1),
(2), (4) Date: Dec. 18, 2007

(87) PCT Pub. No.: WO2006/137424
PCT Pub. Date: Dec. 28, 2006

(65) Prior Publication Data
US 2010/0212579 A1  Aug. 26, 2010

(30) Foreign Application Priority Data

Jun. 21, 2005  (JP) .............................. 2005-180428
Dec. 7, 2005   (JP) .............................. 2005-353218

(51) Int. Cl.
*G01L 19/14* (2006.01)
(52) U.S. Cl. ..................... 116/272; 116/264; 73/744
(58) Field of Classification Search .......... 116/272–274, 116/276, 264; 73/744, 146.8
See application file for complete search history.

(56) References Cited

U.S. PATENT DOCUMENTS

| 1,038,803 | A | * | 9/1912 | Vaughan ............... 73/861.54 |
| 3,386,410 | A | * | 6/1968 | Barnes, Jr. .................. 116/220 |
| 4,072,048 | A | * | 2/1978 | Arvan ..................... 73/146.8 |
| 4,136,560 | A | * | 1/1979 | Gellos ..................... 73/146.8 |
| 4,986,128 | A | * | 1/1991 | Burns ........................ 73/744 |
| 6,164,139 | A | * | 12/2000 | Krimmer ................... 73/744 |

FOREIGN PATENT DOCUMENTS

JP   2-85096   7/1990
(Continued)

OTHER PUBLICATIONS

Corresponding Taiwanese Office Action issued on Oct. 5, 2007.
(Continued)

*Primary Examiner* — R. A. Smith
*Assistant Examiner* — Tania C Courson
(74) *Attorney, Agent, or Firm* — McCormick, Paulding & Huber LLP

(57) ABSTRACT

A pressure state indicator indicates whether or not positive pressure fluid or negative pressure fluid is supplied to a fluid path. A fluid guide member 17 is constituted of a joint main body 11 in which a fluid path 12 is formed and a partition member 16 provided outside the joint main body 11, and an accommodation space 19 is formed by the partition member 16 and the joint main body 11. A pressure chamber 22a communicating with the fluid path 12 through a communicating hole 23 is formed in the accommodation space 19 by a sliding sealing member 21 provided in the accommodation space 19. The sliding sleeve 24 is located at a non-supply position by a spring member 25 when no pressure is supplied to the fluid path 12, and the sliding sleeve 24 is moved to a supply position when pressure is supplied thereto. A pressure state in the fluid path 12 is externally confirmed by observing positions of the sliding sealing member 21 and the sliding sleeve 24 from outside.

21 Claims, 18 Drawing Sheets

FOREIGN PATENT DOCUMENTS

| | | |
|---|---|---|
| JP | 7-22000 | 7/1990 |
| JP | 2-105693 | 8/1990 |
| JP | 2-297066 | 12/1990 |
| JP | 5-126841 | 5/1993 |
| JP | 2001-74762 | 3/2001 |
| JP | 2004-219335 | 8/2004 |

OTHER PUBLICATIONS

Korean Office Action dated Jun. 26, 2008 of corresponding Korean patent application.

International Search Report for PCT/JP2006/312389, dated Sep. 19, 2006.

* cited by examiner

PRESSURE STATE INDICATOR

TECHNICAL FIELD

The present invention relates to a pressure state indicator which externally indicates whether or not fluid is supplied to a fluid path.

BACKGROUND ART

A fluid pressure circuit for supplying compressed air from a compressed air source to a fluid pressure operated unit such as a pneumatic pressure cylinder is provided with control units such as a pressure control valve for adjusting the pressure of compressed air and a directional control valve for switching the flow paths, and a fluid pipe such as a tube is used to connect respective members, which constitute the fluid pressure circuit, to each other. The fluid pipe for connecting the respective members which constitute the fluid pressure circuit is used also in the fluid pressure circuit for supplying liquid pressurized by the pressurization source to the fluid pressure operated unit. The fluid pipe is used also in the fluid pressure circuit for supplying negative pressure air from a negative pressure air source constituted of a vacuum pump and the like to a negative pressure device such as a vacuum pad. The fluid pipe which guides working fluid such as positive pressure air, negative pressure air and liquid includes tube and hose formed of flexible material such as rubber and soft resin and pipes formed of metal or hard resin.

Such a fluid pipe is connected to a control unit or a fluid pressure operated unit through a pipe joint, and as the pipe joint, for example, a screw-in pipe joint, a flareless pipe joint and a flared pipe joint are used for the connection of metallic fluid pipes, and a flareless pipe joint, an instant pipe joint (quick pipe joint) and a barb-type pipe joint are used for the connection of non-metallic pipes, and the fluid pipe is detachably attached so that it can be removed from the pipe joint. Further, the pipe joint includes a quick joint which has a male screw portion to be screwed to a member constituting a pneumatic pressure circuit and to which the fluid pipe is connected detachably.

When the fluid pressure operated unit is actuated in the fluid pressure circuit, fluid flows in the fluid pipe. On the other hand, although no fluid flows in the fluid pipe when a drive unit is stopped, the interior of the fluid pipe is filled with pressurized fluid or negative pressure fluid in some cases. If the fluid pipe provided in the fluid pressure circuit is removed by mistake from the control unit or the pipe joint in the state where the pressurized fluid is filled, pressurized fluid supplied from the fluid pressure source is spouted out.

In order to make it possible to externally confirm whether or not any fluid flows in the fluid pipe connected to the pipe joint, Patent Document 1 has described a pipe joint which has an indicating portion provided so as to project outwardly from an end portion of a L-shaped joint main body or an indicating portion provided outside a straight joint main body so as to project outwardly in a diameter direction of the joint main body. Also, Patent Document 2 has described a pipe joint having a piston provided to a joint main body so as to project outwardly in a diameter direction of the joint main body. On the other hand, Patent Document 3 has described a pressure gauge in which a piston is incorporated movably in an axial direction in a transparent straight tube so that a flow and pressure condition of fluid can be externally confirmed depending on the position of the piston.

Patent Document 1: Japanese Utility Model Application Laid-Open Publication No. 2-85096

Patent Document 2: Japanese Utility Model Application Laid-Open Publication No. 2-105693

Patent Document 3: Japanese Patent Application Laid-Open Publication No. 2001-74762

DISCLOSURE OF THE INVENTION

Problem to be Solved by the Invention

When a fluid pipe such as a tube is connected straight to a communicating path inside the joint main body, if the indicating portion is provided on the joint main body so as to project outwardly in the diameter direction thereof as described in each of the publications, the indicating portion is often concealed below at the time of attaching or detaching the tube. Further, in the case of a pipe joint which is screwed to a fluid pressure unit, the direction in which the pipe joint is stopped is often indefinite. Therefore, if the indicating member is configured to be visible only from a specified direction, movement of the indicating member cannot be seen at all depending on a direction of the indicating member when attaching the pipe joint. Thus, there is a fear that the tube may be detached with pressurized fluid being supplied in the tube.

When attaching a plurality of pipe joints to the fluid pressure unit, since these pipe joints have to be attached while securing the spaces for the indicating portions projecting outwardly in the diameter direction from the joint main body, a lot of pipe joints cannot be attached to a limited space, and it is inevitable to increase the size of the fluid pressure unit to which the pipe joints are to be attached. If the size of the indicating portion is reduced in order to prevent the size increase of the fluid pressure unit, the amount of displacement of the indicating member between the position in which pressurized fluid is supplied and the position in which no pressurized fluid is supplied is small, and thus it becomes difficult to visually check the presence or absence of fluid. As a result, an erroneous operation of pulling out a tube from the pipe joint while pressurized fluid is being supplied might occur. On the other hand, in the case where a pressure state is indicated depending on a position of a piston as described in Patent Document 3, the piston has to be always checked visually through a transparent tube, and whether or not any pressurized fluid is being supplied cannot be determined unless the position of the piston is carefully observed, which causes a problem of poor visibility.

An object of the present invention is to provide a pressure state indicator which can visually and externally confirm whether or not pressurized fluid is supplied to a fluid guide member constituting a fluid pressure circuit.

Another object of the present invention is to provide a pressure state indicator which can visually and externally confirm whether or not negative pressure fluid is supplied to a fluid guide member constituting a fluid pressure circuit.

Still another object of the present invention is to provide a pressure state indicator which can visually and externally confirm whether or not pressurized fluid is supplied, negative pressure fluid is supplied and no fluid is supplied to a fluid guide member constituting the fluid pressure circuit.

Still another object of the present invention is to provide a pressure state indicator which can visually confirm a pressure state of the fluid guide member from the entire circumference of a pipe or a pipe joint and from an end portion.

Still another object of the present invention is to provide a pressure state indicator which can externally indicate a pressure state of a fluid guide member by means of an indicating member so that the pressure state can be checked easily from outside and visibility of the pressurized state from outside can be improved.

Means for Solving the Problem

The pressure state indicator according to the present invention is a pressure state indicator for indicating whether or not positive pressure fluid is supplied to a fluid path, and it comprises: a fluid guide member in which the fluid path is formed and which has an accommodation space extending in an axial direction formed outside the fluid path; a sliding member which is incorporated movably in the axial direction in the accommodation space and partitions the accommodation space into a pressure chamber communicating with the fluid path and an atmospheric pressure chamber communicating with outside; a spring member which is provided in the fluid guide member, positions the sliding member at a non-supply position when no positive pressure fluid is supplied to the fluid path, and moves the sliding member to a pressure supply position when positive pressure fluid is supplied to the pressure chamber from the fluid path; and an indicating portion which is provided in the fluid guide member, and indicates whether or not the sliding member is located at the non-supply position in a state where no positive pressure fluid is supplied to the fluid path and whether or not the sliding member is located at the pressure supply position by positive pressure fluid supplied to the fluid path.

The pressure state indicator according to the present invention is a pressure state indicator for indicating whether or not positive pressure fluid is supplied to a fluid path, and it comprises: a fluid guide member in which the fluid path is formed and which has an accommodation space extending in an axial direction formed outside the fluid path; a sliding member which is incorporated movably in the axial direction in the accommodation space and partitions the accommodation space into a pressure chamber communicating with the fluid path and an atmospheric pressure chamber communicating with outside; a spring member which is provided in the fluid guide member, positions the sliding member at a non-supply position when no negative pressure fluid is supplied to the fluid path, and moves the sliding member to a negative pressure supply position when negative pressure fluid is supplied to the pressure chamber from the fluid path; and an indicating portion which is provided in the fluid guide member, and indicates whether or not the sliding member is located at the non-supply position in a state where no negative pressure fluid is supplied to the fluid path and whether or not the sliding member is located at the pressure supply position by negative pressure fluid supplied to the fluid path.

The pressure state indicator according to the present invention is a pressure state indicator for indicating whether or not positive pressure fluid is supplied to a fluid path, and it comprises: a fluid guide member in which the fluid path is formed and which has an accommodation space extending in an axial direction formed outside the fluid path; a sliding member which is incorporated movably in the axial direction in the accommodation space and partitions the accommodation space into a pressure chamber communicating with the fluid path and an atmospheric pressure chamber communicating with outside; a spring member which is provided in the fluid guide member, positions the sliding member at a non-supply position when neither negative pressure fluid nor positive pressure fluid is supplied to the fluid path, moves the sliding member to a negative pressure supply position when negative pressure fluid is supplied to the fluid path, and moves the sliding member to a positive pressure supply position when positive pressure fluid is supplied to the fluid path; and an indicating portion which is provided in the fluid guide member, and indicates whether or not the sliding member is located at the non-supply position in a state where neither negative pressure fluid nor positive pressure fluid is supplied to the fluid path, whether or not the sliding member is located at the negative pressure supply position by negative pressure fluid supplied to the fluid path, and whether or not the sliding member is located at the positive pressure supply position by positive pressure fluid supplied to the fluid path.

Effect of the Invention

According to the present invention, by externally observing a position of the sliding member provided on/in the fluid guide member, it can be confirmed whether or not positive pressure fluid is flowing in the fluid path of the fluid guide member and whether or not positive pressure fluid is supplied to the fluid path even though the flow is stopped. Further, it can be confirmed whether or not negative pressure fluid is flowing in the fluid path of the fluid guide member and whether or not negative pressure fluid is supplied to the fluid path even though the flow is stopped.

Depending on a position of the sliding sealing member for forming a pressure chamber communicating with the fluid path, a pressure state concerning whether or not positive pressure or negative pressure fluid is supplied to the fluid path can be confirmed from outside.

Depending on a position of the sliding sleeve provided in the accommodation space formed in the fluid guide member, a pressure state concerning whether or not positive pressure or negative pressure fluid is supplied to the fluid path can be confirmed from outside.

Since the sliding sleeve or the sliding sealing member which is a sliding member can be observed from the entire circumference of the fluid guide member, the position of the sliding member can be observed from any direction.

Since the sliding member moves in the axial direction, an internal pressure state can be externally indicated without increasing the size in the diameter direction of the fluid guide member.

It is also preferable that the sliding sleeve which moves together with the sliding sealing member is exposed to the indicating portion and the sliding sleeve is colored. By forming the indicating portion with transparent members, foreign matters such as dusts can be prevented from entering the interior of the fluid guide member without deteriorating the visibility of the indicating portion.

If the fluid guide member is a pipe joint, an internal pressure state of the pipe joint can be externally observed by observing the pipe joint from outside. Since the internal pressure state can be externally indicated without increasing the diameter of the pipe joint, the indicating portion can be observed from outside even when a plurality of pipe joints are adjacently disposed like in manifold type solenoid valves.

If the fluid guide member is a fluid pipe, the internal pressure state can be externally observed without increasing the outside diameter of the fluid pipe.

BRIEF DESCRIPTIONS OF THE DRAWINGS

BEST MODE FOR CARRYING OUT THE INVENTION

Hereinafter, embodiments of the present invention will be described in detail with reference to the embodiments thereof. Components having the same function are denoted by the same reference symbols throughout the drawings for describing the embodiments.

Figure 1:
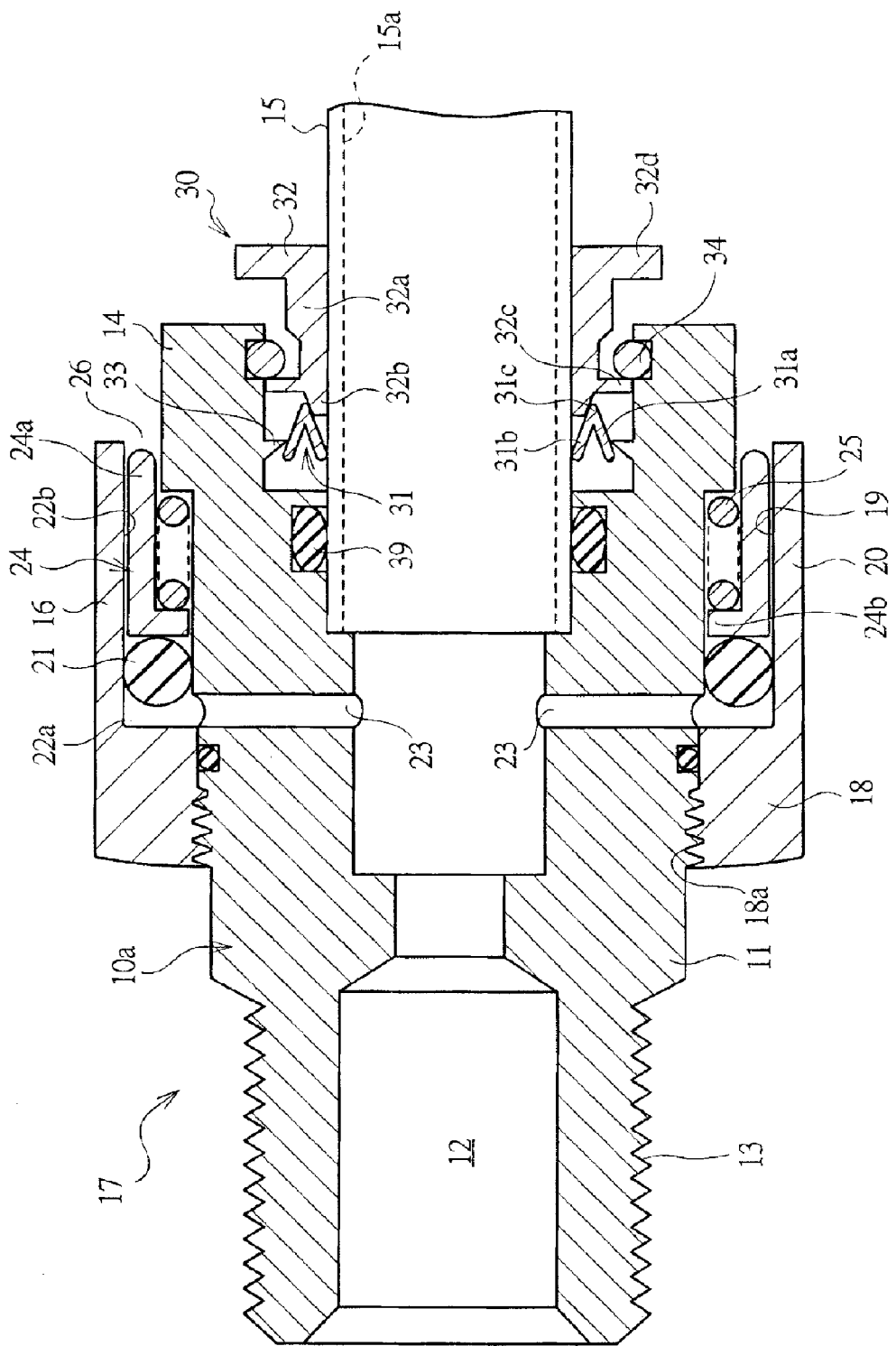
FIG. 1 is a sectional view showing a pipe joint to which the pressure state indicator of the present invention is applied.

A pipe joint 10a shown in FIG. 1 is of the straight type, and it is attached to a control unit or a fluid pressure operated unit constituting a fluid pressure circuit and is used to guide compressed air. The pipe joint 10a includes a cylindrical joint main body 11 having a step, and a fluid path 12 for guiding compressed air is formed in the joint main body 11 so as to penetrate through the inside of the joint main body 11. A male screw 13 for use in attaching the pipe joint 10a to the control unit or the fluid pressure operated unit is provided on the proximal end portion of the joint main body 11, and the fluid pipe 15 is detachably connected to a connecting end portion 14 on the front end side. This fluid pipe 15 is formed of flexible material made of soft resin such as nylon and urethane, and when the fluid pipe 15 is connected to the connecting end portion 14, a fluid path 15a therein communicates with the fluid path 12 of the joint main body 11.

A joint assembly 30 for detachably or removably connecting the fluid pipe 15 to the pipe joint 10a is provided to the connecting end portion 14. The joint assembly 30 has an annular lock pawl 31 to be incorporated in the connecting end portion 14 and a release ring 32 to be incorporated against an end face side of the lock pawl 31 so that it can be displaced freely in the axial direction. The lock pawl 31 has an outside piece 31a which engages with a projecting portion 33 formed on the inner peripheral face of the connecting end portion 14 and an inside piece 31b which bites into the outer peripheral face of the fluid pipe 15, and the outside piece 31a and the inside piece 31b are integrated through a fold-back portion 31c on the opening portion side of the connecting end portion 14. The lock pawl 31 is formed of spring material, and a front end side of the inside piece 31b is deformed elastically in the diameter direction with respect to the fold-back portion 31c as a starting point, and the lock pawl 31 applies a tightening force to the fluid pipe 15.

On the other hand, the release ring 32 has a ring main body 32a through which the fluid pipe 15 to be connected to the connecting end portion 14 runs, and the inward end portion of the ring main body 32a is provided with a front end portion 32b which opposes the inside piece 31b of the lock pawl 31 and an engagement portion 32c projecting outwardly in the diameter direction. The outward end portion thereof is provided with a flange portion 32d which is disposed outside the joint main body 11 and projects outwardly in the diameter direction. The joint main body 11 is equipped with an annular stopper 34 which makes contact with the engagement portion 32c so as to prevent the release ring 32 from slipping out of the joint main body 11, and the release ring 32 moves in the axial direction between a position in which the engagement portion 32c makes contact with the stopper 34 and a position in which it makes contact with the projecting portion 33.

When the fluid pipe 15 formed from nylon tube is inserted into the joint assembly 30, the inside piece 31b of the lock pawl 31 bites into the fluid pipe 15 by its elastic force to be in a locked state. When an external force in a direction of separating from the joint main body 11 is applied to the fluid pipe 15 under this condition, the inside piece 31b is deformed elastically so that it bites into the fluid pipe 15, thereby preventing the fluid pipe 15 from slipping out. When removing the fluid pipe 15 from the pipe joint 10a, the release ring 32 is pushed in by operating the flange portion 32d. By doing so, the inside piece 31b of the lock pawl 31 is elastically deformed outwardly in the diameter direction and the locked state is released. By this means, the fluid pipe 15 can be removed easily. When the fluid pipe 15 is attached to the joint assembly 30, a gap between the fluid pipe 15 and the joint main body 11 is sealed by a sealing member 39.

A cylindrical partition member 16 is provided outside the joint main body 11, and a fluid guide member 17 is constituted of the joint main body 11 and the partition member 16. The partition member 16 has a fixing portion 18 provided with a female screw 18a to be screwed to the joint main body 11, and a cylindrical portion 20 which is integrated with the fixing portion 18 to form a cylindrical accommodation space 19 with the connecting end portion 14. An annular sliding sealing member 21 made of elastic material such as rubber is incorporated in the cylindrical accommodation space 19 so that it makes contact with the outer peripheral face of the joint main body 11 and the inner peripheral face of the partition member 16 and moves freely in the axial direction, and the accommodation space 19 is partitioned into a pressure chamber 22a and an atmospheric pressure chamber 22b by this sliding sealing member 21. The pressure chamber 22a communicates with the fluid path 12 through a communicating hole 23 formed in the joint main body 11, and compressed air which is fluid flowing in the fluid path 12 flows into the pressure chamber 22a. Note that, although FIG. 1 indicates two communicating holes 23, it is also preferable to provide one communicating hole or three or more communicating holes.

A sliding sleeve 24 is incorporated in the atmospheric pressure chamber 22b in the accommodation space 19 so that it is located on the front end side of the joint main body 11 with respect to the sliding sealing member 21, and this sliding sleeve 24 has a cylindrical portion 24a and a flange portion 24b projecting inwardly in the diameter direction and located at the inward end portion thereof. A spring member 25, one end of which makes contact with the flange portion 24b and the other end of which makes contact with a step portion of the joint main body 11, is incorporated inside the sliding sleeve 24, and a spring force in a direction toward the proximal end portion of the joint main body 11, that is, in a direction of contracting the pressure chamber 22a is applied to the sliding sealing member 21 by this spring member 25 through the sliding sleeve 24. Note that this spring member 25 is a compression coil spring.

An annular opening portion 26 for opening the atmospheric pressure chamber 22b of the accommodation space 19 to the outside is provided inside an end face of the partition member 16 as an indicating portion, and when compressed air is supplied to the pressure chamber 22a, the sliding sealing member 21 moves toward the front end side of the joint main body 11 together with the sliding sleeve 24 against the spring force. In other words, the sliding sleeve 24 moves in a direction of expanding the pressure chamber 22a, and the sliding sealing member 21 and the sliding sleeve 24 are located at a pressurization position. At the pressurization position, the sliding sleeve 24 projects in the axial direction from the opening portion 26 in the end face of the partition member 16, and the sliding sleeve 24 is exposed clearly to the outside. Contrary to this, when the compressed air supplied into the pressure chamber 22a is discharged, the sliding sealing member 21 and the sliding sleeve 24 are retracted by a spring force to a position at a movement end in the left direction in FIG. 1, that is, to a rest position (non-pressurization position), and the sliding sealing member 21 and the sliding sleeve 24 are retracted and concealed in the partition member 16.

FIG. 1 shows a state where no compressed air is supplied into the fluid path 12 when the fluid pipe 15 is connected to the pipe joint 10a. Since no compressed air flows into the pressure chamber 22a in this state and atmospheric pressure or similar pressure is applied to the chamber 22a, the sliding sealing member 21 is located at the rest position on the inner side in the axial direction of the partition member 16, that is, at the non-pressurization position by a spring force as shown in FIG. 1. At this time, the sliding sleeve 24 is located inside the partition member 16 so that its end face is located on an inner side relative to an end face of the partition member 16.

In this state, when compressed air is fed to the fluid path 12 in order to supply the compressed air to a drive unit such as a pneumatic pressure cylinder from a pneumatic pressure source such as a compressor (not shown), the compressed air in the fluid path 12 flows into the pressure chamber 22a through the communicating hole 23. Consequently, the sliding sealing member 21 and the sliding sleeve 24 move in the right direction in FIG. 1 against a spring force, and the sliding sleeve 24 projects from the end face of the partition member 16 and is exposed clearly to the outside. Therefore, when the sliding sleeve 24 is projected from the opening portion 26 as an indicating portion, it is clearly and externally indicated that the compressed air is supplied into the fluid pipe 15.

As described above, depending on whether or not the sliding sleeve 24 is projected from the opening portion 26 in the pipe joint 10a shown in FIG. 1, that is, depending on whether or not the sliding sleeve 24 can be confirmed visually from outside, it can be determined whether or not compressed air is supplied into the pipe joint 10a. Since this sliding sleeve 24 is configured to be displaced along the direction in which fluid in the pipe joint 10a flows, no member projecting in the diameter direction is provided on the pipe joint 10a, and thus the size increase of the pipe joint 10a can be prevented and the amount of displacement of the sliding sleeve 24 in the axial direction can be set large. In this manner, the amount of displacement of the sliding sleeve 24 is set large and the sliding sleeve 24 is widely indicated to the outside at its indication position or the pressurization position. By this means, the changes in the sliding sleeve 24 can be confirmed visually from outside easily, and it can be surely detected whether or not any pressure is applied to the fluid path 12. Since the amount of displacement of the sliding sleeve 24 is proportional to the magnitude of fluid pressure, the magnitude of the fluid pressure can also be detected by confirming the amount of displacement.

Figure 2:
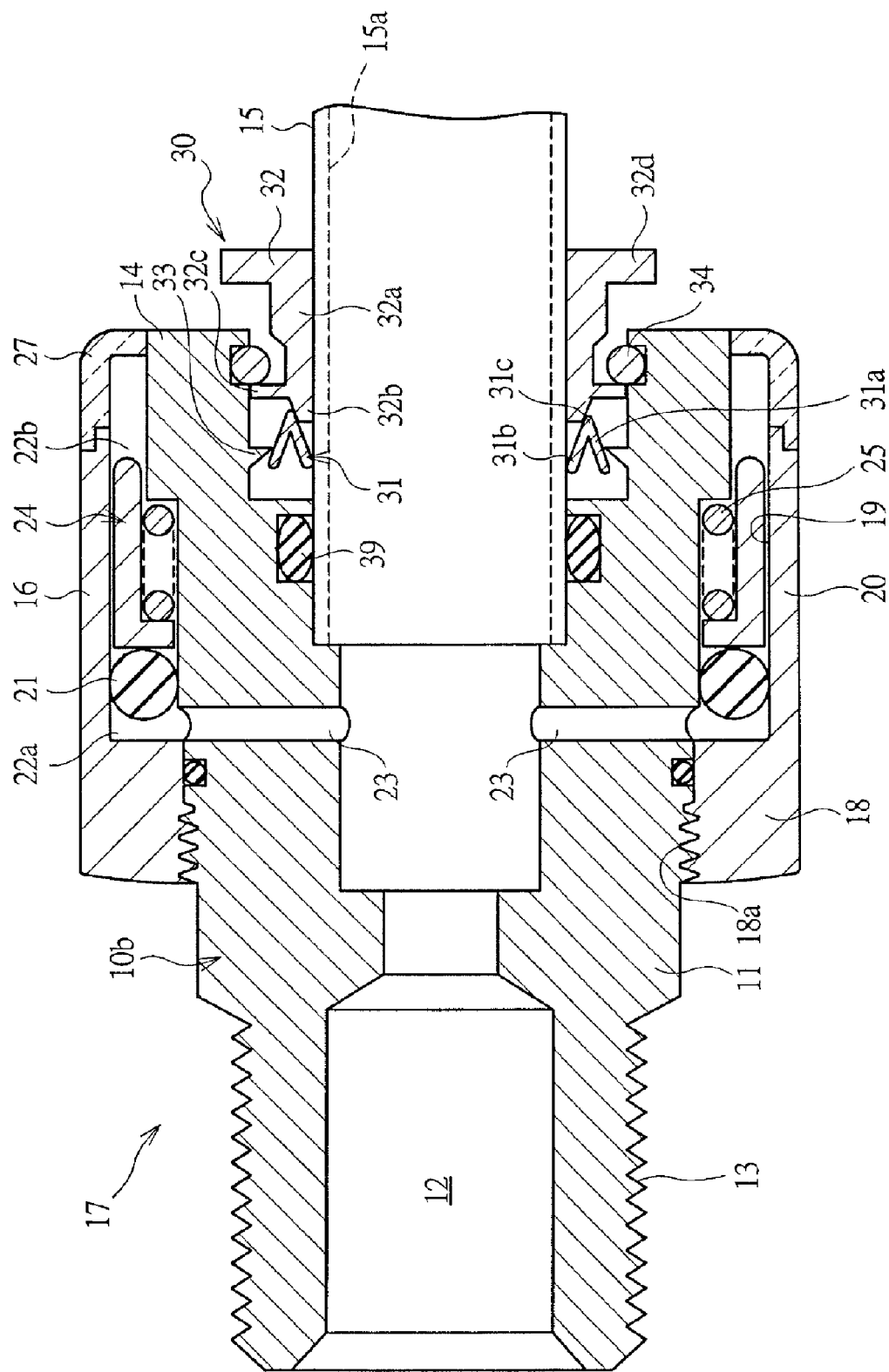
FIG. 2 is a sectional view showing a pipe joint to which the pressure state indicator of the present invention is applied.

In the pipe joint 10b shown in FIG. 2, a transparent member 27 made of transparent resin material is provided on the front end face of the partition member 16 and the transparent member 27 serves as an indicating portion. Since the opening portion at the end face of the partition member 16 is covered with the transparent member 27, foreign matter such as dust can be prevented from getting into the accommodation space 19 inside the partition member 16 without losing visibility of the sliding sleeve 24. Note that a bleed hole (not shown) which communicates the atmospheric pressure chamber 22b with the outside is formed in the partition member 16.

Figure 3:
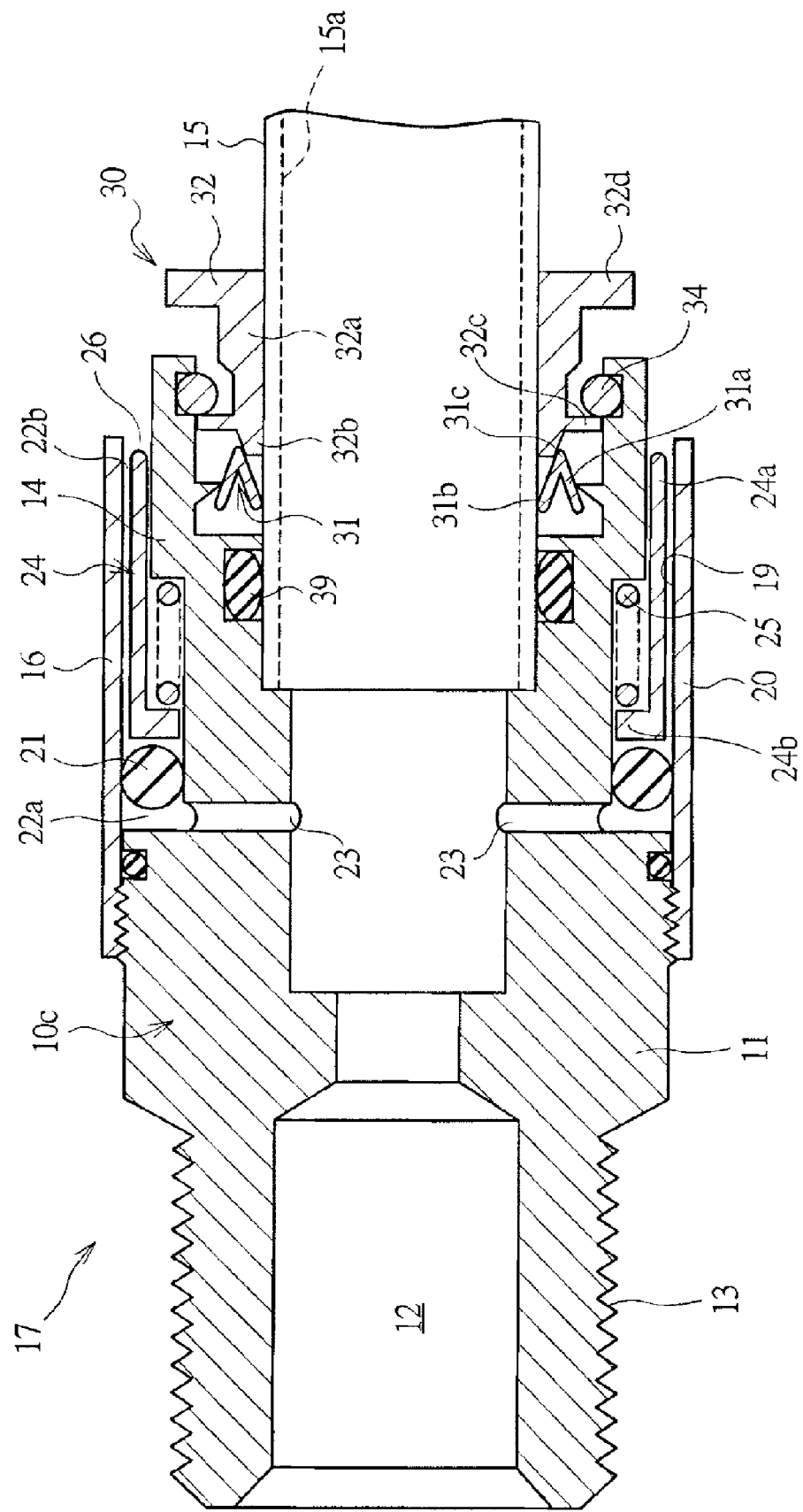
FIG. 3 is a sectional view showing a pipe joint to which the pressure state indicator of the present invention is applied.

In the pipe joint 10c shown in FIG. 3, the cylindrical connecting end portion 14 of the joint main body 11 has a smaller diameter than that in FIG. 1 and FIG. 2, and the partition member 16 is formed of pipe material constituted of only a cylindrical portion 20. Consequently, the joint main body 11 is formed to have a smaller diameter than that of the joint main body 11 shown in FIG. 1 and FIG. 2, and thus a smaller pipe joint 10c can be formed.

Figure 4:
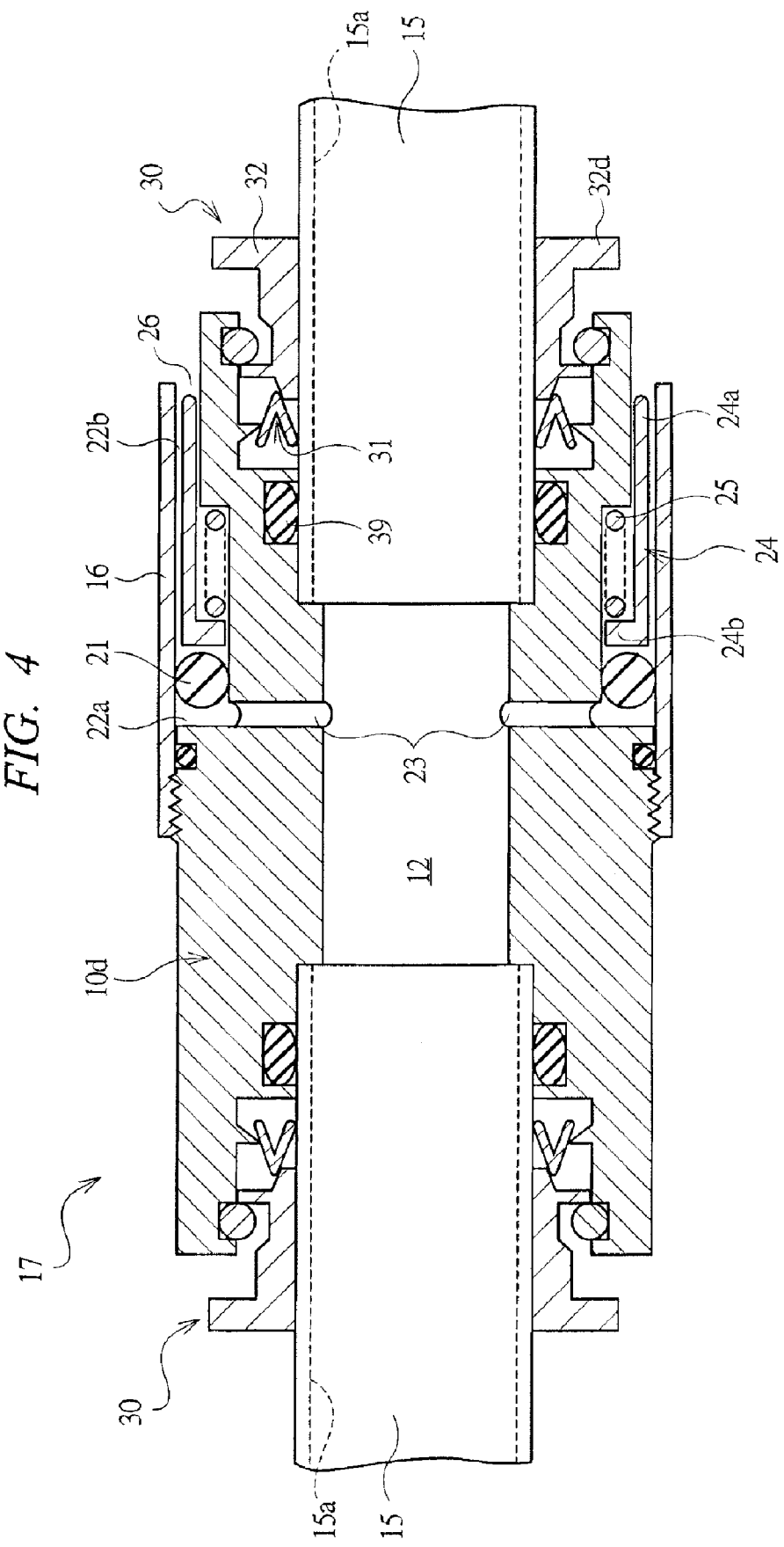
FIG. 4 is a sectional view showing a pipe joint to which the pressure state indicator of the present invention is applied.

In the pipe joint 10d shown in FIG. 4, a joint assembly 30 to which the fluid pipe 15 is to be detachably connected is provided on each of both end portions of the joint main body 11, and the structure of each joint assembly 30 is the same as described above and the same partition member 16 as shown in FIG. 3 is provided on the right portion of the joint main body 11 in FIG. 4.

Figure 5:
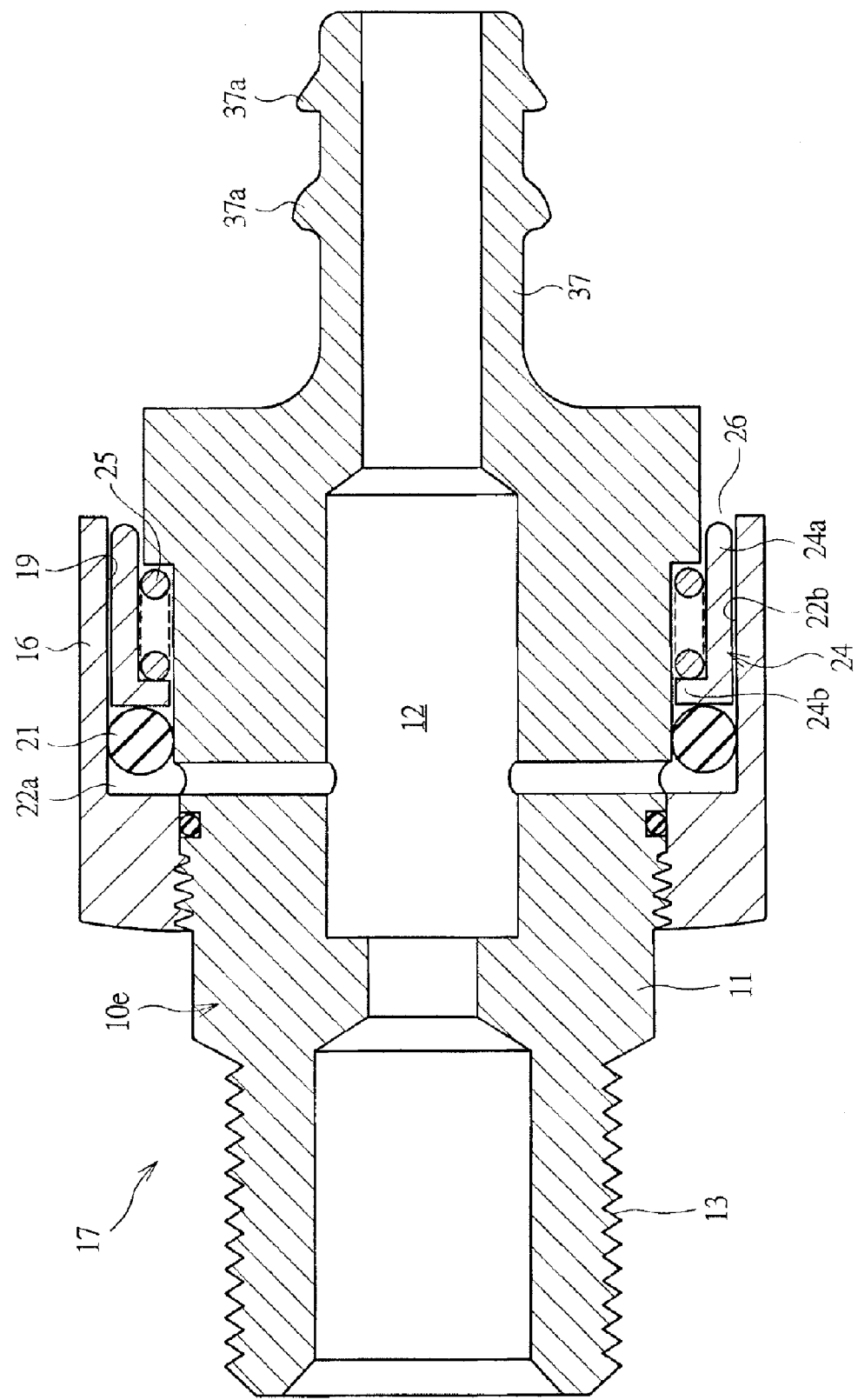
FIG. 5 is a sectional view showing a pipe joint to which the pressure state indicator of the present invention is applied.

In the pipe joint 10e shown in FIG. 5, a connecting pipe portion 37, to an outer peripheral face of which a fluid pipe such as a tube or hose is to be fitted, is provided integrally with the joint main body 11 as a joint portion, and this connecting pipe portion 37 is projected outwardly in the axial direction from an end face of the cylindrical connecting end portion 14. Biting projecting portions 37a are provided on the outer peripheral face of the connecting pipe portion 37 so as to be projected outwardly in the diameter direction, and when a tube or hose (not shown) is fitted to the outer peripheral face of the connecting pipe portion 37, the biting projecting portion 37a bites into the inner face of a fluid pipe such as a tube, and the inserted fluid pipe cannot be pulled out easily.

Figure 6:
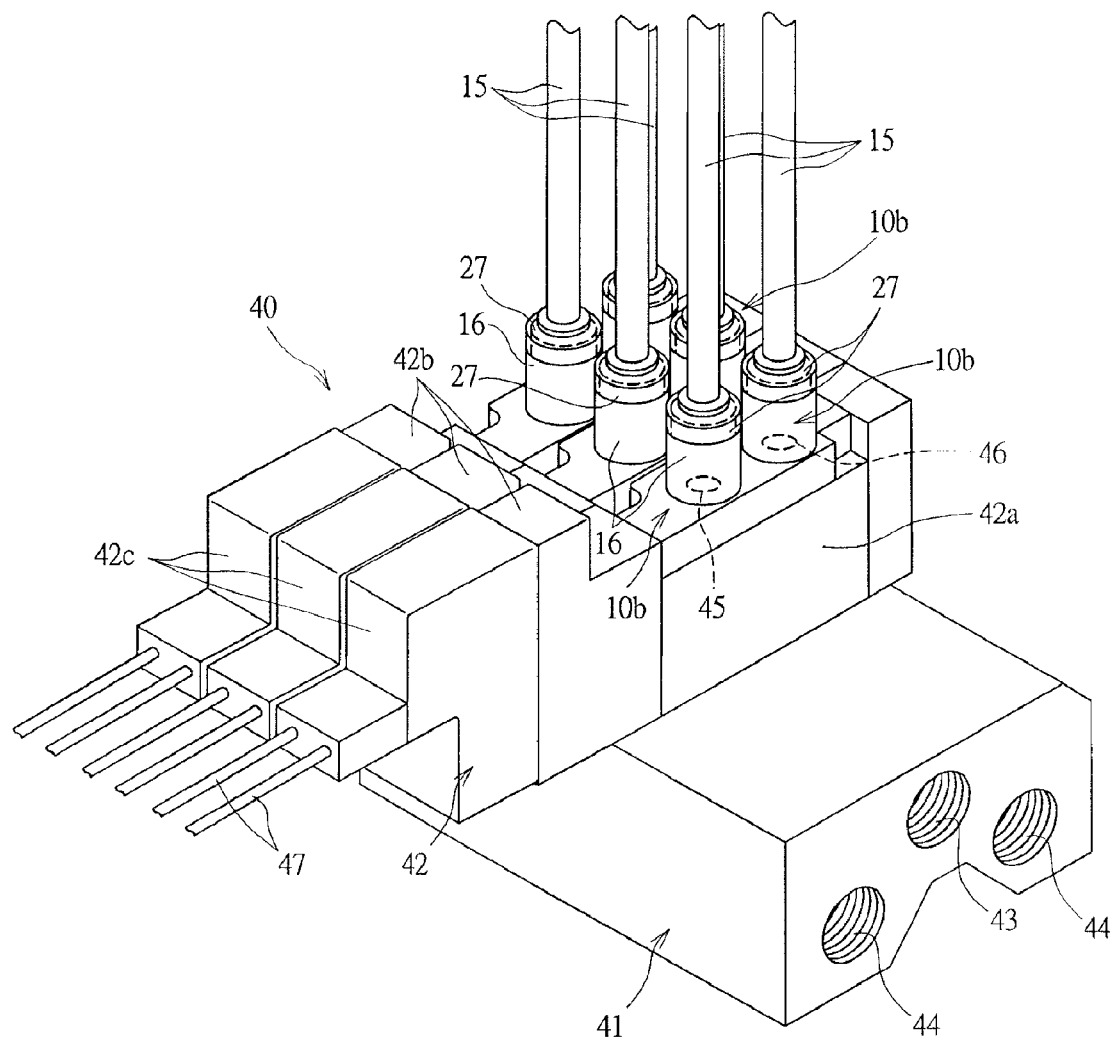
FIG. 6 is a perspective view showing an example of a fluid pressure operated unit equipped with pipe joints.

FIG. 6 is a perspective view showing an example of a control unit equipped with the pipe joint 10b shown in FIG. 2. The control unit shown in FIG. 6 is a manifold type solenoid valve 40 in which a plurality of solenoid valves 42 are mounted on a manifold block 41. A common air supply hole 43 to be connected to the air supply source and two exhaust holes 44 to be connected to an exhaust hose are formed in the manifold block 41. Each solenoid valve 42 has a main valve portion 42a fixed to the manifold block 41 and a pilot portion 42b incorporating a pilot piston for driving a main valve shaft contained in the main valve portion 42a, and the pilot portion 42b is provided with a direct acting valve portion 42c which incorporates a solenoid and switches supply and discharge of compressed air to the pilot piston.

Each solenoid valve 42 is a 5-port 2-position switching valve, and the pipe joints 10b shown in FIG. 2 are attached to a main valve portion 42a so as to communicate with two output ports 45 and 46 formed in the main valve portion 42a, and the fluid pipe for supplying compressed air to a drive unit such as a pneumatic cylinder is connected to each pipe joint 10b. By sending a drive signal to the solenoid of each solenoid valve 42 through an electric cable 47, one output port and the air supply hole 43 are brought into a communicated state and the other output port and any exhaust hole are brought into a communicated state. In this manner, supply and discharge of compressed air in the drive unit are controlled.

In such a manifold type solenoid valve 40, when compressed air is supplied to any one of the two ports 45 and 46, the sliding sleeve 24 of the pipe joint 10b communicating with the port on a side supplied with the compressed air moves to the inside of the transparent member 27 as an indicating portion. Therefore, by externally confirming that the sliding sleeve 24 is located at a pressurization position through the transparent member 27, the port to which compressed air is supplied can be confirmed from outside. The sliding sleeve 24 is a cylindrical member, and the sliding sleeve 24 can be confirmed from any direction when it is at the pressurization position. Accordingly, it never happens that the sliding sleeve 24 is invisible from outside depending on the direction or angle of the pipe joint 10b when the pipe joint 10b is screwed to the main valve portion 42a. Further, since the sliding sleeve 24 is designed to move in the axial direction of the joint main body 11 or the direction of flow and it does not move in the diameter direction from the joint main body 11, even when a plurality of the pipe joints 10b are adjacently disposed as in the manifold type solenoid valve 40, the pipe joint 10b of the present invention can be mounted instead of a conventional pipe joint having no pressure indicating function without increasing the size of the pipe joint 10b.

Figure 7A:
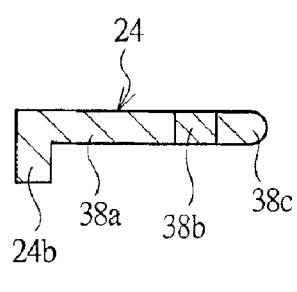
FIG. 7A to FIG. 7D are sectional views showing major portions of the pressure state indicator according to another embodiment of the present invention.

FIG. 7A to FIG. 7D are sectional views showing major portions of the pressure state indicator according to other embodiments of the present invention. FIG. 7A shows a modification example of the sliding sleeve 24, in which the sliding sleeve 24 is provided with indicating portions 38a to 38c which are colored in accordance with the positions in the axial direction, and the indicating portion 38a and the indicating portion 38c are colored in blue while the indicating portion 38b is colored in red. Thus, when the sliding sleeve 24 is located at the pressurization position, the red indicating portion 38b is seen from outside. By coloring the sliding sleeve 24, the movement of the sliding sleeve 24 and the amount of its displacement can be confirmed visually and clearly from outside. Each coloring may be performed by painting the outer peripheral face of the sliding sleeve 24 made of metal or resin, or the sliding sleeve 24 may be formed using colored resin materials. The number of colors to be painted is not limited to any particular one and fluorescent color may be used, and its pattern is not restricted. However, it is preferable to select a color which is vivid and clearly visible.

Figure 7B:
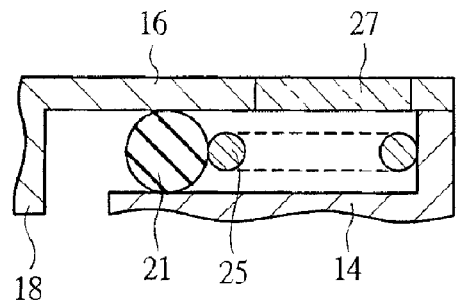
Figure 7C:
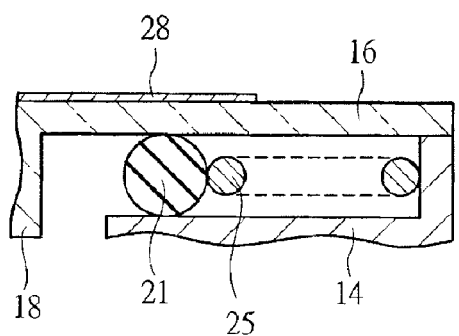

In the pipe joints shown in FIG. 7B and FIG. 7C, a non-pressurization state and pressurization state are indicated by exposing the sliding sealing member 21 to the outside through the transparent member 27 as an indicating portion without using the sliding sleeve 24. In the case shown in FIG. 7B, the transparent member 27 is provided to the non-transparent partition member 16 made of metal or resin, thereby forming the indicating portion from the transparent member 27. In this case, the sliding sealing member 21 may be colored in red or orange so that the sliding sealing member 21 can be externally confirmed visually through the transparent member 27.

In the case shown in FIG. 7C, the partition member 16 is formed of transparent material and a non-transparent covering member 28 is attached to the partition member 16 so that the sliding sealing member 21 is not seen from outside when the sliding sealing member 21 is located at the non-pressurization position, and the portion to which the covering member 28 is not attached is employed as an indicating portion where the sliding seating member 21 is exposed to the outside when the sliding sealing member 21 reaches the pressurization position. Instead of the covering member 28, its corresponding portion may be colored to conceal the sliding sealing member 21 at the non-pressurization position.

Figure 7D:
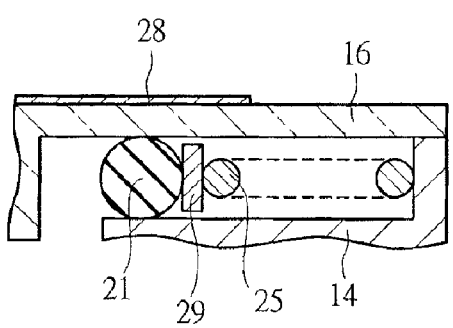

FIG. 7D is a modification example of FIG. 7C. In this case, a ring 29 made of metal or resin is provided between the sliding sealing member 21 and the spring member 25 so as to prevent the direct contact between the sliding sealing member 21 and the spring member 25. In this case, when the sliding sealing member 21 reaches the pressurization position, the ring 29 is also exposed to the outside through the transparent portion.

Figure 8:
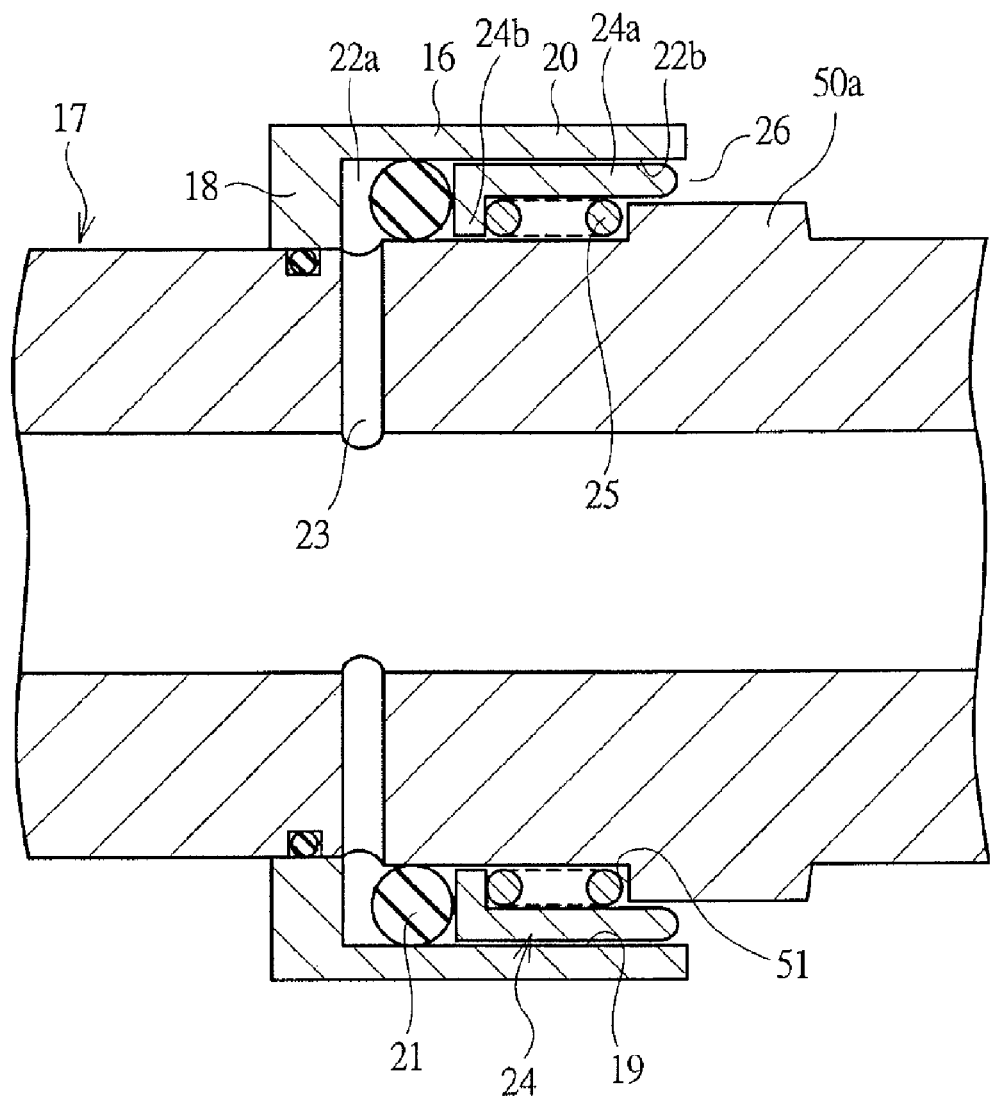
FIG. 8 is a sectional view showing a fluid pipe to which the pressure state indicator of the present invention is applied.

FIG. 8 is a sectional view showing a fluid pipe to which the pressure state indicator of the present invention is applied. A fluid pipe 50a is formed of hard material such as metal and resin and has the fluid path 12 therein, and it is connected to a drive unit or a control unit directly or through the pipe joint, thereby constituting a fluid pressure circuit.

The partition member 16 having the fixing portion 18 and the cylindrical portion 20 is fixed to the outside of the fluid pipe 50a, and the fluid guide member 17 is formed by the partition member 16 and the fluid pipe 50a and the cylindrical accommodation space 19 extending in the axial direction is provided therein. Although the partition member 16 is pressed in and fixed to the fluid pipe 50a, it may be fixed by screwing as shown in FIG. 1 to FIG. 4 or may be fixed by welding. In the cylindrical accommodation space 19, the annular sliding sealing member 21 made of elastic material such as rubber is incorporated movably in the axial direction in the same manner as the pipe joints described above so that it makes contact with the outer peripheral face of the fluid pipe 50a and the inner peripheral face of the partition member 16. The pressure chamber 22a is formed in the accommodation space 19 by the sliding sealing member 21. This pressure chamber 22a communicates with the fluid path 12 through the communicating hole 23 formed in the fluid pipe 50a, and compressed air which is fluid in the fluid path 12 flows into the pressure chamber 22a.

The sliding sleeve 24 is incorporated in the accommodation space 19 so that it is located on an opposite side to the fixing portion 18 through the sliding sealing member 21, and this sliding sleeve 24 has a cylindrical portion 24a and a flange portion 24b projecting inwardly in the diameter direction and located at the inward end portion thereof. The spring member 25, one end of which makes contact with the flange portion 24b and the other end of which makes contact with a step portion 51 formed in the fluid pipe 50a, is incorporated inside the sliding sleeve 24, and a spring force in a direction toward the fixing portion 18 of the partition member 16, that is, a direction of contracting the pressure chamber 22a is applied to the sliding sealing member 21 by this spring member 25 through the sliding sleeve 24.

The opening portion 26 for opening the accommodation space 19 to the outside is provided inside the end face of the partition member 16 as the indicating portion, and when compressed air is supplied to the pressure chamber 22a, the sliding sealing member 21 moves together with the sliding sleeve 24 toward the end face side of the partition member 16, that is, toward the opening portion 26 side against the spring force, and the sliding sealing member 21 and the sliding sleeve 24 reach the pressurization position. At the pressurization position, the sliding sleeve 24 is projected in the axial direction from the opening portion 26 of the end face of the partition member 16, and the sliding sleeve 24 is exposed clearly to the outside. Contrary to this, when the compressed air supplied into the pressure chamber 22a is discharged, the sliding sealing member 21 and the sliding sleeve 24 are retracted by the spring force to the position of the movement end in the left direction in FIG. 8, that is, to the non-pressurization position (rest position), and they are retracted and concealed in the partition member 16.

FIG. 8 shows a state where no compressed air is supplied into the fluid path 12 of the fluid pipe 50a. In this state, since no compressed air flows into the pressure chamber 22a and the atmospheric pressure or similar pressure is attained, the sliding sealing member 21 is kept at the rest position by the spring force as shown in FIG. 8. At this time, the sliding sleeve 24 is located inside the partition member 16 so that its end face is located on an inner side relative to an end face of the partition member 16.

In this state, when compressed air is supplied to the fluid path 12 in order to supply the compressed air to a drive unit such as a pneumatic pressure cylinder from a pneumatic pressure source such as a compressor (not shown), the compressed air in the fluid path 12 flows into the pressure chamber 22a through the communicating hole 23. Consequently, the sliding sealing member 21 and the sliding sleeve 24 move in the right direction in FIG. 8 against a spring force, and the sliding sleeve 24 projects from the end face of the partition member 16 and is exposed clearly to the outside. Therefore, when the sliding sleeve 24 is projected from the opening portion 26 as an indicating portion, it is clearly and externally indicated that the compressed air is supplied into the fluid pipe 50a.

As described above, depending on whether or not the sliding sleeve 24 as an indicating portion is projected from the opening portion 26 in the pipe joint 50a shown in FIG. 8, that is, depending on whether or not the sliding sleeve 24 can be confirmed visually from outside, it can be determined whether or not compressed air is supplied into the fluid pipe 50a. Since this sliding sleeve 24 is configured to be displaced along the direction in which fluid in the fluid pipe 50a flows, no member projecting in the diameter direction is provided on the fluid pipe 50a, and thus the amount of displacement of the sliding sleeve 24 in the axial direction can be set large without increasing the size of the fluid pipe 50a in the diameter direction. In this manner, the amount of displacement of the sliding sleeve 24 is set large and the sliding sleeve 24 is widely indicated to the outside at its indication position or the pressurization position. By this means, the changes in the sliding sleeve 24 can be confirmed visually from outside easily, and it can be surely detected whether or not any pressure is applied to the fluid. Since the amount of displacement of the sliding sleeve 24 is proportional to the magnitude of fluid pressure, the magnitude of the fluid pressure can also be detected by confirming the amount of displacement.

Also in the fluid pipe 50a shown in FIG. 8, the transparent member 27 shown in FIG. 2 can be provided, and the partition member 16 can be formed from a pipe with a small thickness as shown in FIG. 3. In such a case, a flange portion is provided to the fluid pipe 50a in order to fix the partition member 16. Further, the partition member 16 can be designed to have the structures as shown in FIG. 7A to FIG. 7D, and it is permissible to use no sliding sleeve 24.

As described above, the pressure state indicator shown in FIG. 1 to FIG. 8 is used to indicate whether or not positive pressure fluid is supplied into the fluid path 12.

Figure 9:
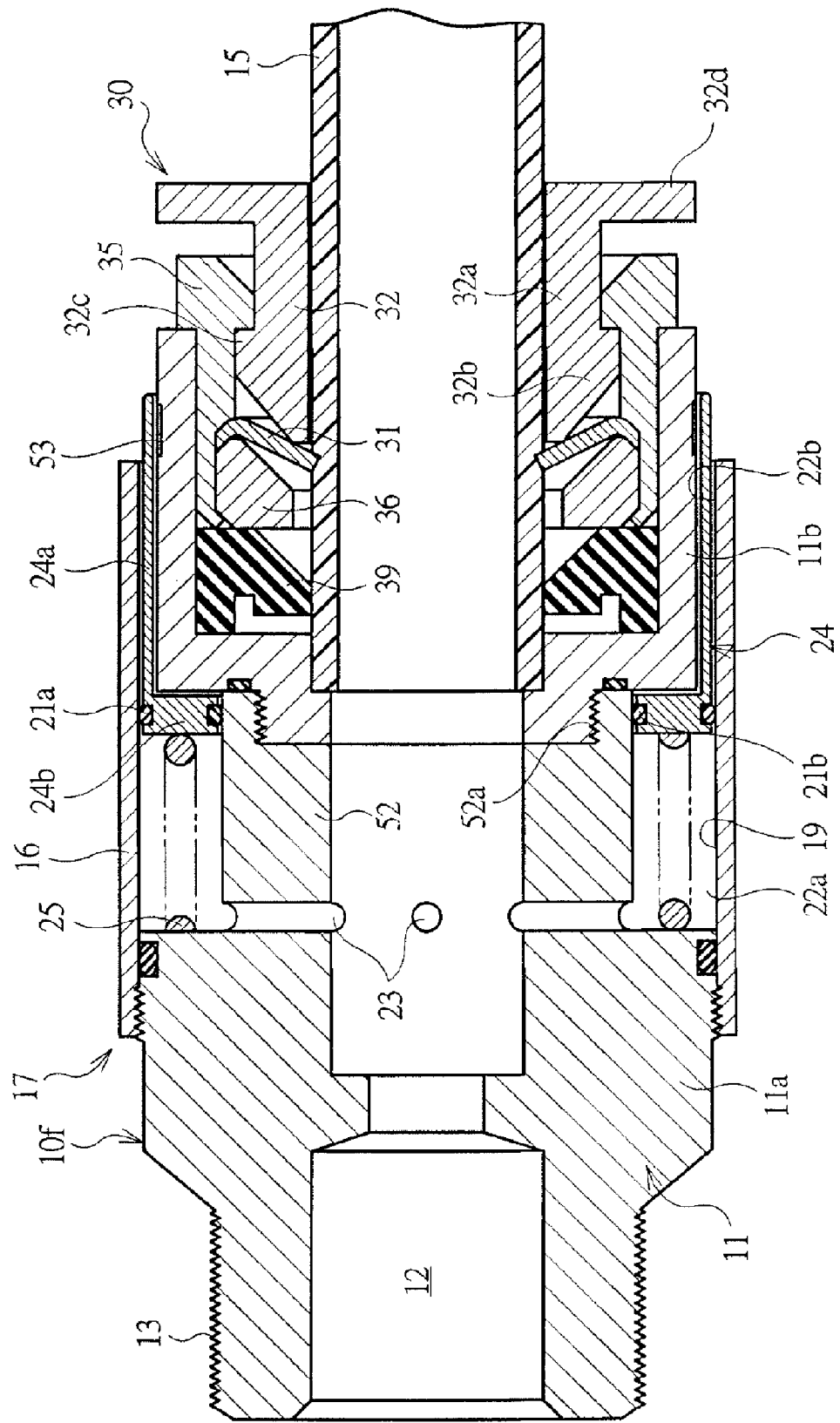
FIG. 9 is a sectional view showing a pipe joint to which the pressure state indicator of the present invention is applied.

A pipe joint 10f shown in FIG. 9 has a cylindrical joint main body 11 formed of a first joint member 11a and a second joint member 11b to be screwed thereto. The joint main body 11 is provided with the fluid path 12 for guiding negative pressure fluid. A male screw 13 for connecting the joint main body 11 to a fluid operated unit or a control unit is formed on one end portion of the joint member 11a, and a small diameter portion 52 is formed on the other end portion thereof. A female screw 52a with which the male screw formed on one end portion of the joint member 11b is coupled is formed in this small diameter portion 52, and the joint assembly 30 for connecting the fluid pipe 15 detachably is provided on the other end portion of the joint member 11b. This joint assembly 30 has a guide member 35 to be fixed in the joint member 11b, and the sealing member 39 in contact with the fluid pipe 15 is fixed by the guide member 35. The lock pawl 31 is fixed by the positioning ring 36 fixed inside the guide member 35, and the release ring 32 for opening the lock of the fluid pipe 15 with the lock pawl 31 is mounted in the guide member 35 so as to be movable in the axial direction.

The partition member 16 is attached outside the joint main body 11 and the fluid guide member 17 is constituted of the joint main body 11 and the partition member 16. The accommodation space 19 is formed by the outer peripheral face of the small diameter portion 52 of the first joint member 11a, the outer peripheral face of the second joint member 11b and the inner peripheral face of the partition member 16. The sliding sleeve 24 is incorporated slidably in the axial direction in the accommodation space 19, and the sliding sleeve 24 has a cylindrical portion 24a and a flange portion 24b which is provided integrally with the proximal end portion thereof. A sliding sealing member 21a which makes contact with the inner peripheral face of the partition member 16 is mounted on the outer periphery of the flange portion 24b, and a sliding sealing member 21b which makes contact with the outer peripheral face of the first joint member 11b is mounted on the inner periphery of the flange portion 24b. The accommodation space 19 is partitioned by these sliding sealing members 21a and 21b into the pressure chamber 22a communicating with the fluid path 12 through the communicating hole 23 and the atmospheric pressure chamber 22b communicating with outside.

When negative pressure fluid is supplied from the fluid path 12 to the pressure chamber 22a through the communicating hole 23, the sliding sleeve 24 receives a thrust force in a direction of entering the accommodation space 19, that is, in a direction of contracting the pressure chamber 22a. The spring member 25 is mounted in the pressure chamber 22a in order to apply a spring force to the sliding sleeve 24 in a direction of expanding the pressure chamber 22a against the thrust force so that the front end of the sliding sleeve 24 is projected from the opening portion 26 between the partition member 16 and the joint main body 11. When negative pressure fluid is not supplied into the fluid path 12, the sliding sleeve 24 is moved by this spring force to the rest position, that is, the non-supply position shown in FIG. 9. On the other hand, when negative pressure fluid is supplied into the pressure chamber 22a, the sliding sleeve 24 is moved by the atmospheric pressure to a supply position on the left side in FIG. 9.

An indicating portion 53 is provided on the outer peripheral face of the joint main body 11 so that it is located on an outer side in the axial direction relative to an end face of the partition member 16. The indicating portion 53 is colored in, for example, vivid red, which is a different color from other portions. When the sliding sleeve 24 is located at the non-supply position, it is shielded by the sliding sleeve 24 as shown in FIG. 9, and when the sliding sleeve 24 is moved to the supply position, the sliding sleeve 24 enters the accommodation space 19 and the indicating portion 53 is observed from outside.

Figure 10:
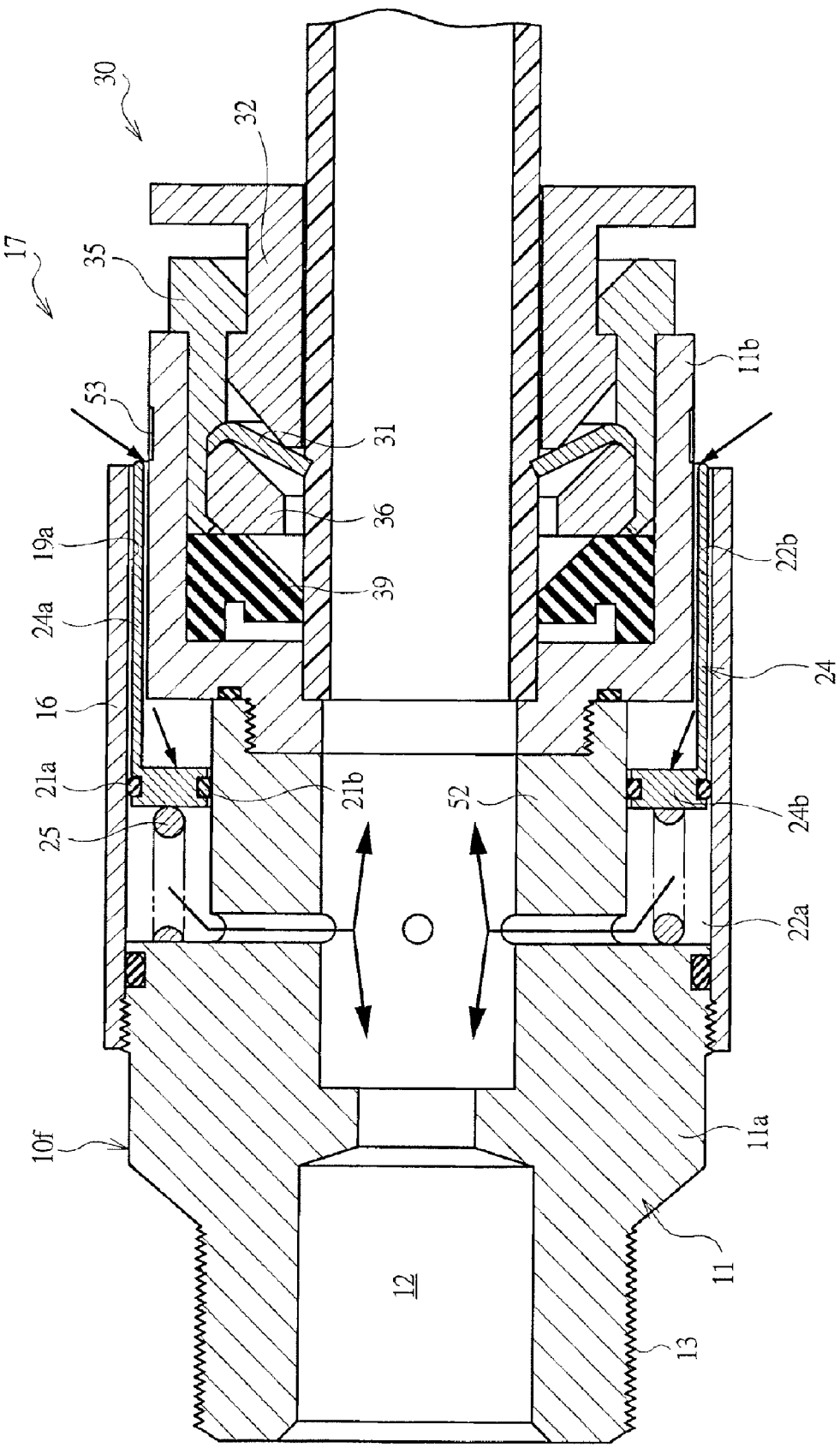
FIG. 10 is a sectional view showing an operating state of the pressure state indicator shown in FIG. 9.

FIG. 10 is a sectional view showing a state where negative pressure fluid is supplied to the fluid path 12 of the pipe joint 10f shown in FIG. 9. When negative pressure fluid is supplied to the fluid path 12, the fluid inside the pressure chamber 22a flows out to the fluid path 12 through the communicating hole 23 and air flows in from outside through the opening portion 26 between the partition member 16 and the joint main body 11. Consequently, the sliding sleeve 24 moves against the spring force to the left side in FIG. 9 from the non-supply position shown in FIG. 9, and enters the partition member 16, and then, the sliding sleeve 24 moves to a negative pressure supply position as shown in FIG. 10. By this movement of the sleeve 24 to a negative pressure supply position, the indicating portion 53 is exposed outside and becomes visible.

On the other hand, when supply of the negative pressure fluid to the fluid path 12 is stopped and the pressure of the fluid path 12 turns to the atmospheric pressure, pressure inside the pressure chamber 22a communicating with the fluid path 12 through the communicating hole 23 also turns to the atmospheric pressure, and the sliding sleeve 24 moves toward the non-supply position by the spring force of the spring member 25. When the front end portion of the sliding sleeve 24 is projected from the partition member 16 and the indicating portion 53 is covered with the front end portion, it can be confirmed visually from outside that the pressure in the fluid path 12 is of atmospheric pressure or a higher pressure (positive pressure).

In this case, the entry/exit of the sliding sleeve 24 as the sliding member with respect to the partition member 16 is indicated externally. If the sliding sleeve 24 itself is colored in, for example, vivid red, the entry of the sliding sleeve 24 into the partition member 16 can be easily confirmed visually from outside, and thus, the colored indicating portion 53 can be omitted.

In the pipe joint 10f shown in FIG. 9 and FIG. 10, whether or not negative pressure fluid is supplied to the fluid path 12 can be confirmed from outside by visually checking the entry/exit of the sliding sleeve 24 moving together with the sliding sealing members 21a and 21b with respect to the partition member 16. Since the movement of the sliding sleeve 24 is checked from outside, whether or not negative pressure fluid is supplied to the fluid path 12 can be confirmed easily from outside by seeing the pipe joint 10g from any direction regardless of an installation condition of the pipe joint 10g.

When a plurality of the pipe joints 10f are installed on the manifold type solenoid valve 40 as a fluid operated unit shown in FIG. 6, the movement of the sliding sleeve 24 can be confirmed from any direction. Although the case where the sliding sleeve 24 conceals the indicating portion 53 when it is located at the non-supply position shown in FIG. 9 has been described in the embodiment above, the present invention is not restricted to this example. For example, it is also preferable to provide the indicating portion by coloring the outer peripheral face of a front end portion of the sliding sleeve 24 over the entire periphery. In this case, when the pressure chamber 22a turns into a negative pressure and the sliding sleeve 24 moves from the non-supply position to the negative pressure supply position, the indicating portion is covered and concealed by the partition member 16, and it can be confirmed that negative pressure fluid is supplied to the fluid path 12 by checking this concealment from outside.

Although the case where the portion 53 colored in vivid red is used has been described in the embodiment above, the present invention is not restricted to this example. For example, in the case where the installation position of the pipe joint 10g is at a dark place such as photo lab, the indicating portion 53 can be colored by luminescent paint by taking into account the ease of seeing. Although the pipe joint 10f is of straight type, the present invention can be applied to any pipe joint such as L-shaped type (elbow type), Y-shaped type and T-shaped type as long as it is applicable to a fluid operated unit to which fluid is supplied.

Figure 11:
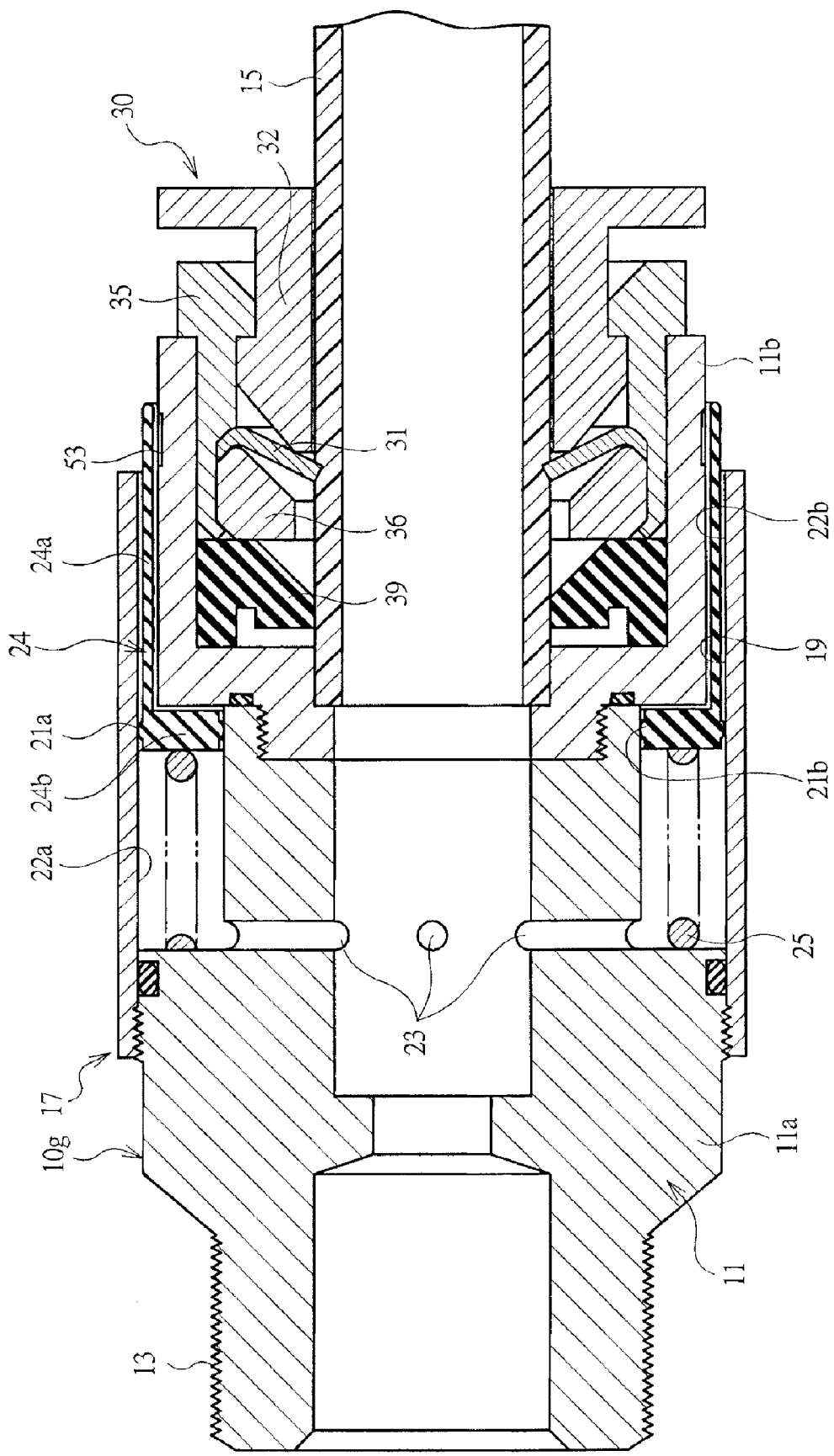
FIG. 11 is a sectional view showing a pipe joint to which the pressure state indicator of the present invention is applied.

FIG. 11 is a sectional view showing a pipe joint to which the pressure state indicator of the present invention is applied. A cylindrical portion 24a, a flange portion 24b and sliding sealing members 21a and 21b made of material having an excellent sealing performance such as soft rubber are integrated to form the sliding sleeve 24 of the pipe joint 10g. In this pipe joint 10g, even if the sliding sleeve 24 collides with other member due to the pulsation that occurs when the internal pressure of the pressure chamber 22a changes little by little, occurrence of noises can be prevented because the sliding sleeve 24 is made of soft rubber. Since the sliding sealing members 21a and 21b are formed integrally with the sliding sleeve 24, assembly work for the sliding sealing members 21a and 21b is not required and the number of steps for assembly can be reduced.

Figure 12:
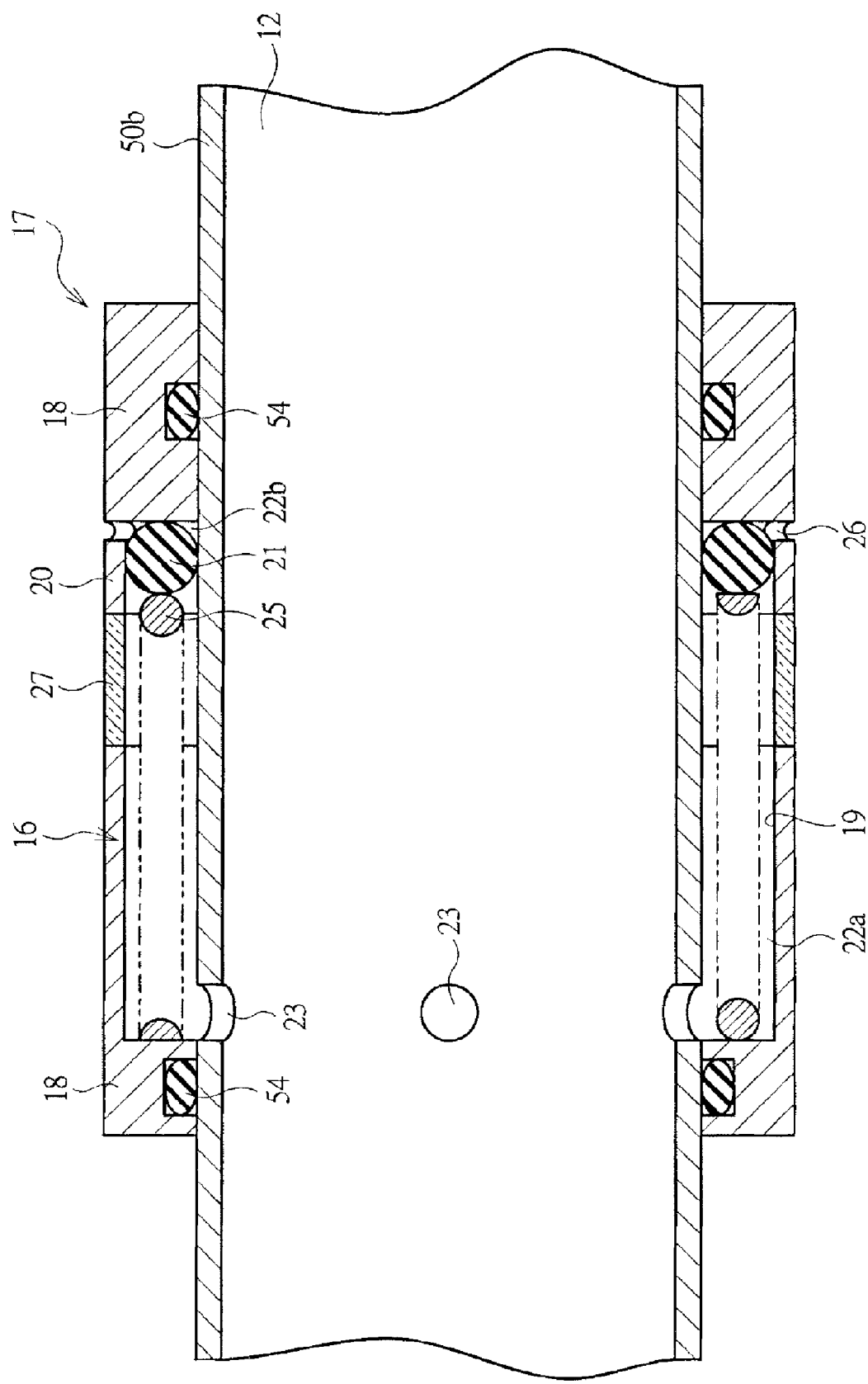
FIG. 12 is a sectional view showing a fluid pipe to which the pressure state indicator of the present invention is applied.

FIG. 12 is a sectional view showing a fluid pipe to which the pressure state indicator of the present invention is applied. The fluid pipe 50b includes the fluid path 12 internally like the fluid pipe 50a shown in FIG. 8, and it is connected to a drive unit or a control unit directly or through a pipe joint, thereby constituting a fluid pressure circuit. Negative pressure fluid is supplied to the fluid path 12 of this fluid pipe 50b.

The partition member 16 having the cylindrical portion 20 and the annular fixing portion 18 provided on both ends thereof is fixed to the outside of the fluid pipe 50b, and the fluid guide member 17 is constituted of this partition member 16 and the fluid pipe 50b so that the cylindrical accommodation space 19 extending in the axial direction is provided in the fluid guide member 17. The partition member 16 is fitted to the fluid pipe 50a through the fixing portions 18 on both sides, and the sealing material 54 is provided in each fixing portion 18 to seal a gap between the fixing portion 18 and the fluid pipe 50b.

The annular sliding sealing member 21 made of elastic material such as rubber is incorporated in the cylindrical accommodation space 19 so that it makes contact with the outer peripheral face of the fluid pipe 50b and the inner peripheral face of the partition member 16 and moves freely in the axial direction. The accommodation space 19 is divided into the pressure chamber 22a and the atmospheric pressure chamber 22b by this sliding sealing chamber 21. This pressure chamber 22a communicates with the fluid path 12 through the communicating hole 23 formed in the fluid pipe 50a, and negative pressure fluid which is fluid in the fluid path 12 flows into the pressure chamber 22a.

The spring member 25 is incorporated in the pressure chamber 22a, and a spring force in a direction toward the non-supply position on one end side of the accommodation space 19 is applied to the sliding sealing member 21 by this spring member 25. An annular transparent member 27 made of material having transparency such as glass and transparent plastic is adhered to the partition member 16. The transparent member 27 functions as the indicating portion, and the interior of the accommodation space 19 is seen from outside through the transparent member 27. However, the transparent member 27 does not need to be provided annually but may be provided partially in the circumferential direction at plural positions. Alternatively, also by forming a part or the whole of the partition member 16 from a material having transparency and then covering a portion thereof other than the transparent member 27 with a material having light blocking effect, the indicating portion can be obtained. That is, any structure is available as long as the interior of the pressure chamber 22a can be seen easily from outside.

When negative pressure fluid is supplied to the fluid path 12 of the fluid pipe 50b shown in FIG. 12, fluid in the pressure chamber 22a flows out to the fluid path 12, and air flows into the atmospheric pressure chamber 22b from outside. Consequently, the sliding sealing member 21 moves to the left in FIG. 12 from the rest position shown in FIG. 12, that is, the non-supply position and then reaches a position of the transparent member 27. In this manner, the sliding sealing member 21 is located at the negative pressure supply position. When the sliding sealing member 21 is moved to the negative pressure supply position, since the sliding sealing member 21 is observed through the transparent member 27 from outside, it is confirmed from outside that negative pressure fluid is supplied to the fluid path 12. If the sliding sealing member 21 is colored in, for example, vivid red, since it can be indicated more clearly that the sliding sealing member 21 is located at the negative pressure supply position, the visibility can be improved.

Figure 13:
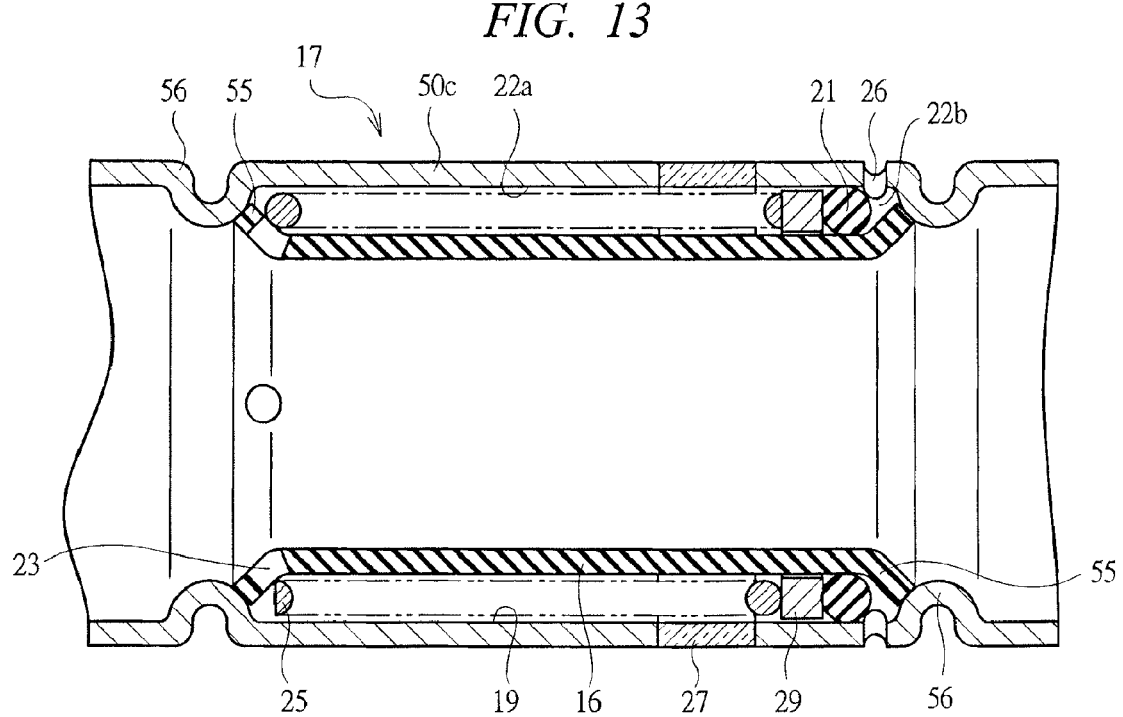
FIG. 13 is a sectional view showing a fluid pipe to which the pressure state indicator of the present invention is applied.

FIG. 13 is a sectional view showing a fluid pipe to which the pressure state indicator is applied. The cylindrical partition member 16 is attached in the fluid pipe 50c so as to form the accommodation space 19 between the partition member 16 and the fluid pipe 50c, and the fluid path 12 is formed inside the accommodation space 19. The partition member 16 is formed of metal, resin or rubber, and an enlarged diameter portion 55 whose diameter is enlarged as it goes to an end face is provided on both end portions thereof. The enlarged diameter portion 55 makes air-tight contact with an annular protrusion 56 formed on the fluid pipe 50c so as to project inwardly in the diameter direction.

The sliding sealing member 21 is provided movably in the axial direction in the accommodation space 19, and the accommodation space 19 is divided into the pressure chamber 22a and the atmospheric pressure chamber 22b by this sliding sealing member 21. The spring member 25 is provided in the pressure chamber 22a and an end portion of this spring member 25 makes contact with the sliding sealing member 21 through the ring 29. Thus, a spring force in a direction of expanding the pressure chamber 22a is applied to the sliding sealing member 21 by the spring member 25. Therefore, when negative pressure fluid is supplied to the pressure chamber 22a, the sliding sealing member 21 moves to the left side in FIG. 13 from the non-supply position shown in FIG. 13 and then reaches a position of the transparent member 27. In this manner, the sliding sealing member 21 is located at the negative pressure supply position. Note that it is also possible to provide a filter to the opening portion 26 in order to prevent foreign matter from flowing into the atmospheric pressure chamber 22b.

Since the sliding sealing member 21 is observed from outside through the transparent member 27 when the sliding sealing member 21 is moved to the negative pressure supply position, it can be confirmed from outside that negative pressure fluid is supplied to the fluid path 12. Different from the fluid pipe 50b shown in FIG. 12, the fluid pipe 50c shown in FIG. 13 has no partition cylinder projecting outwardly. Therefore, appearance of the fluid pipe 50c can be improved.

In the fluid guide member 17 shown in FIG. 13, the partition member 16 which is a cylindrical member is incorporated in the fluid pipe 50c so as to form the pressure chamber 22a between the partition member 16 and the fluid pipe 50c, and negative pressure fluid in the fluid path 12 is supplied to the pressure chamber 22a. However, it is also possible to incorporate the partition member 16 in the fluid pipe 50a so as to form the accommodation space 19 even when positive pressure fluid is supplied from the fluid path 12 to the pressure chamber 22a as shown in FIG. 8. In this case, the fluid pipe 50a is funned of a pipe having a small thickness like the fluid pipe 50c, and the spring member 25 is provided in the atmospheric pressure chamber 22b in the same manner as the case shown in FIG. 8 because positive pressure fluid is supplied to the pressure chamber 22a partitioned by the sliding sealing member 21.

The pressure state indicator shown in FIG. 9 to FIG. 13 is used to indicate whether or not negative pressure fluid is supplied to the fluid path 12.

As a pressure state indicator which indicates whether or not negative pressure fluid is supplied to the fluid path 12, the structure is also available, in which the sliding sealing member 21 which partitions the accommodation space 19 into the pressure chamber 22a and the atmospheric pressure chamber 22b is incorporated in the accommodation space 19 as shown in FIG. 7B to FIG. 7D, and the sliding sealing member 21 can be observed through a transparent member from outside when negative pressure fluid is supplied to the fluid path 12 and the sliding sealing member 21 is located at the negative pressure supply position. In this case, the spring member 25 is incorporated in the pressure chamber 22a. Further, also in a type in which the sliding sealing member 21 and the sliding sleeve 24 to be moved together are incorporated in the accommodation space 19 as shown in FIG. 2, it is also possible to configure the sliding sleeve 24 to be observed through a transparent member from outside. In this case, the spring member 25 is incorporated in the pressure chamber 22.

Figure 14:
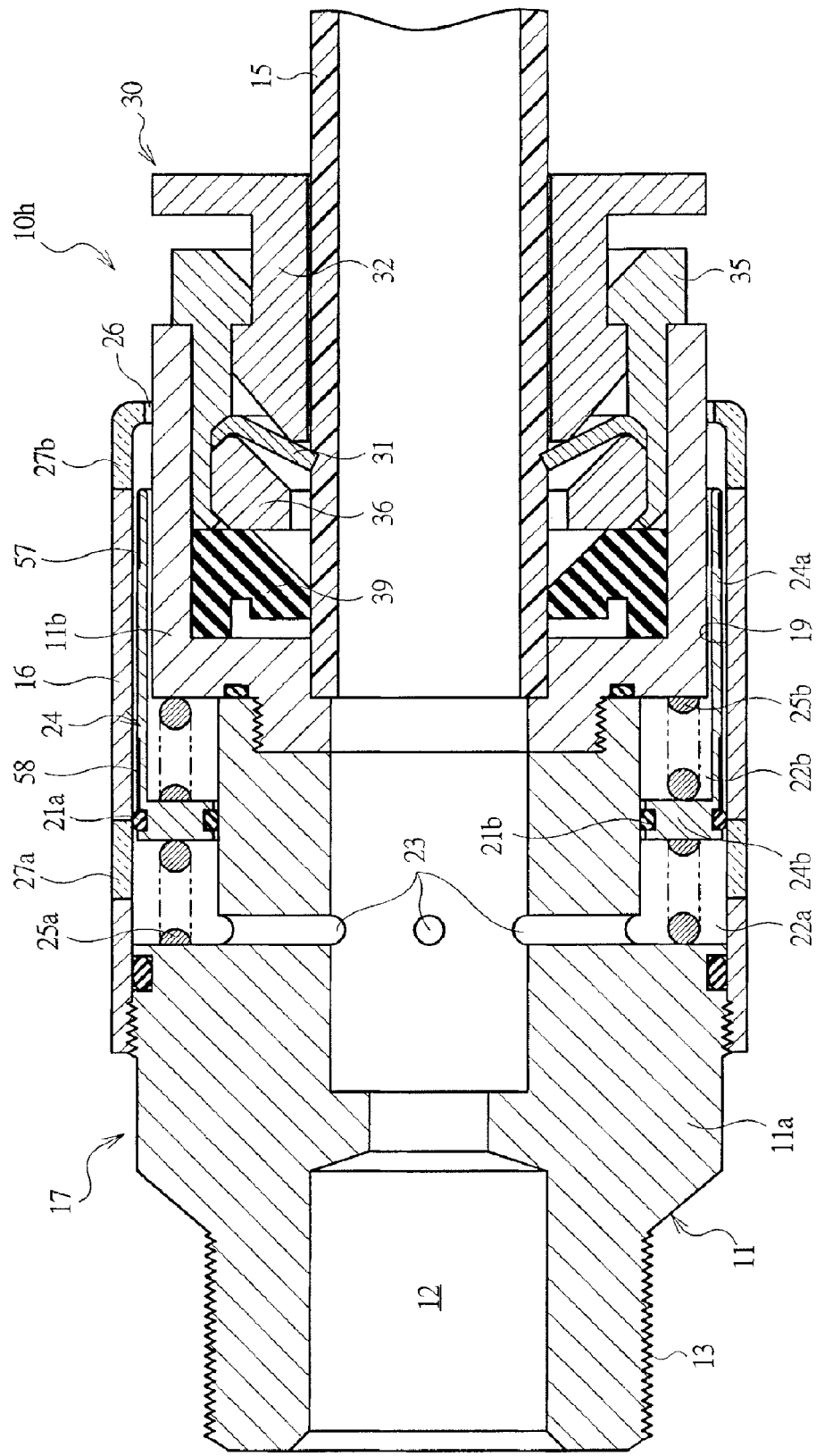
FIG. 14 is a sectional view showing a pipe joint to which the pressure state indicator of the present invention is applied.

FIG. 14 is a sectional view showing a pipe joint to which the pressure state indicator is applied. This pipe joint 10h is applicable to both a fluid pressure circuit to which positive pressure fluid is supplied and a fluid pressure circuit to which negative pressure is supplied. When it is applied to the fluid pressure circuit to which positive pressure fluid is supplied, whether or not positive pressure fluid is supplied internally can be visually confirmed from outside. If it is applied to the fluid pressure circuit to which negative pressure fluid is supplied, whether or not negative pressure fluid is supplied internally can be visually confirmed from outside.

In the pipe joint 10h, the joint main body 11 is comprised of the first joint member 11a and the second joint member 11b like the pipe joint 10f shown in FIG. 10, and the fluid guide member 17 is formed of the joint main body 11 and the partition member 16 mounted to the outside thereof. The sliding sleeve 24 is incorporated in the accommodation space 19 formed by the partition member 16 and the joint main body 11, and the sliding sleeve 24 is comprised of the cylindrical portion 24a and the flange portion 24b provided integrally at a proximal end portion thereof. The sliding sealing member 21a which makes contact with the inner peripheral face of the partition member 16 is mounted on the outer periphery of the flange portion 24b, and the sliding sealing member 21b which makes contact with the outer peripheral face of the first joint member 11b is mounted on the inner periphery of the flange portion 24b. The accommodation space 19 is partitioned by these sliding sealing members 21a and 21b into the pressure chamber 22a which communicates with the fluid path 12 through the communicating hole 23 and the atmospheric pressure chamber 22b which communicates with the outside through the opening portion 26.

In the partition member 16, a transparent member 27a is provided at a position corresponding to the pressure chamber 22a, and a transparent member 27b is provided at a position corresponding to the atmospheric pressure chamber 22b. An exposed portion 57 colored in, for example, blue is provided on the outer peripheral face at the front end portion of the sliding sleeve 24, and an exposed portion 58 colored in, for example, red is provided on the outer peripheral face at the proximal end portion of the sliding sleeve 24.

A spring member 25a is mounted in the pressure chamber 22a and a spring member 25b is mounted in the atmospheric pressure chamber 22b, and the sliding sleeve 24 is positioned by the two spring members 25a and 25b at a neutral position, that is, at the rest position which indicates a state where neither positive pressure fluid nor negative pressure fluid is supplied to the fluid path 12. When positive pressure fluid is supplied to the pressure chamber 22a, the sliding sleeve 24 moves to the right in FIG. 14, and an exposed portion 57 provided at the front end of the sliding sleeve 24 is located at a position of the transparent member 27b. On the other hand, when negative pressure fluid is supplied to the pressure chamber 22a, the sliding sleeve 24 moves to the left in FIG. 14, and an exposed portion 58 provided on the proximal end portion of the sliding sleeve 24 is located at a position of the transparent member 27a.

In the case where the pipe joint 10h shown in FIG. 14 is used in a fluid pressure circuit which employs negative pressure fluid as a working medium, when the negative pressure fluid is supplied to the fluid path 12, the fluid in the pressure chamber 22a flows out to the fluid path 12 through the communicating hole 23, and air flows into the atmospheric pressure chamber 22b from outside. Consequently, the sliding sleeve 24 is moved to the left side in FIG. 14 from the rest position (non-supply position) shown in FIG. 14. By this movement of the sliding sleeve 24, the exposed portion 58 is moved to the transparent member 27a provided in the partition member 16, and it can be confirmed visually that negative pressure fluid is supplied to the fluid path 12.

On the other hand, when supply of negative pressure fluid to the fluid path 12 is stopped and the atmospheric pressure is attained, the internal pressure of the pressure chamber 22a becomes equal to the internal pressure of the atmospheric pressure chamber 22b, and the sliding sleeve 24 is moved toward the rest position shown in FIG. 14 by a spring force of the spring member 25a in the pressure chamber 22a. When the internal pressure of the pressure chamber 22a is balanced with the internal pressure of the atmospheric pressure chamber 22b, both the spring members 25a and 25b are balanced, and the sliding sleeve 24 is located at the rest position shown in FIG. 14 and the exposed portion 58 is concealed by the partition member 16. Consequently, it can be confirmed visually that no negative pressure fluid is supplied to the fluid path 12.

In the case where the pipe joint 10h is used in a fluid pressure circuit which employs positive pressure fluid as a working medium, when the positive pressure fluid is supplied to the fluid path 12, fluid in the fluid path 12 flows into the pressure chamber 22a through the communicating hole 23, and air in the atmospheric pressure chamber 22b is discharged to the outside. Consequently, the sliding sleeve 24 moves to the right in FIG. 14 from the reset position shown in FIG. 14. By this movement of the sliding sleeve 24, the exposed portion 57 is located at a position of the transparent member 27b, and it can be confirmed visually from outside that positive pressure fluid is supplied to the fluid path 12.

On the other hand, when supply of positive pressure fluid to the fluid path 12 is stopped, the sliding sleeve 24 moves to the rest position shown in FIG. 14. When the internal pressure of the pressure chamber 22a is balanced with a pressure in the atmospheric pressure chamber 22b, both the spring members 25a and 25b are balanced, and the sliding sleeve 24 is located at the rest position shown in FIG. 14 and the indicating portion is concealed by the partition member 16. Consequently, it can be confirmed visually from outside that no positive pressure fluid is supplied to the fluid path 12.

Figure 15:
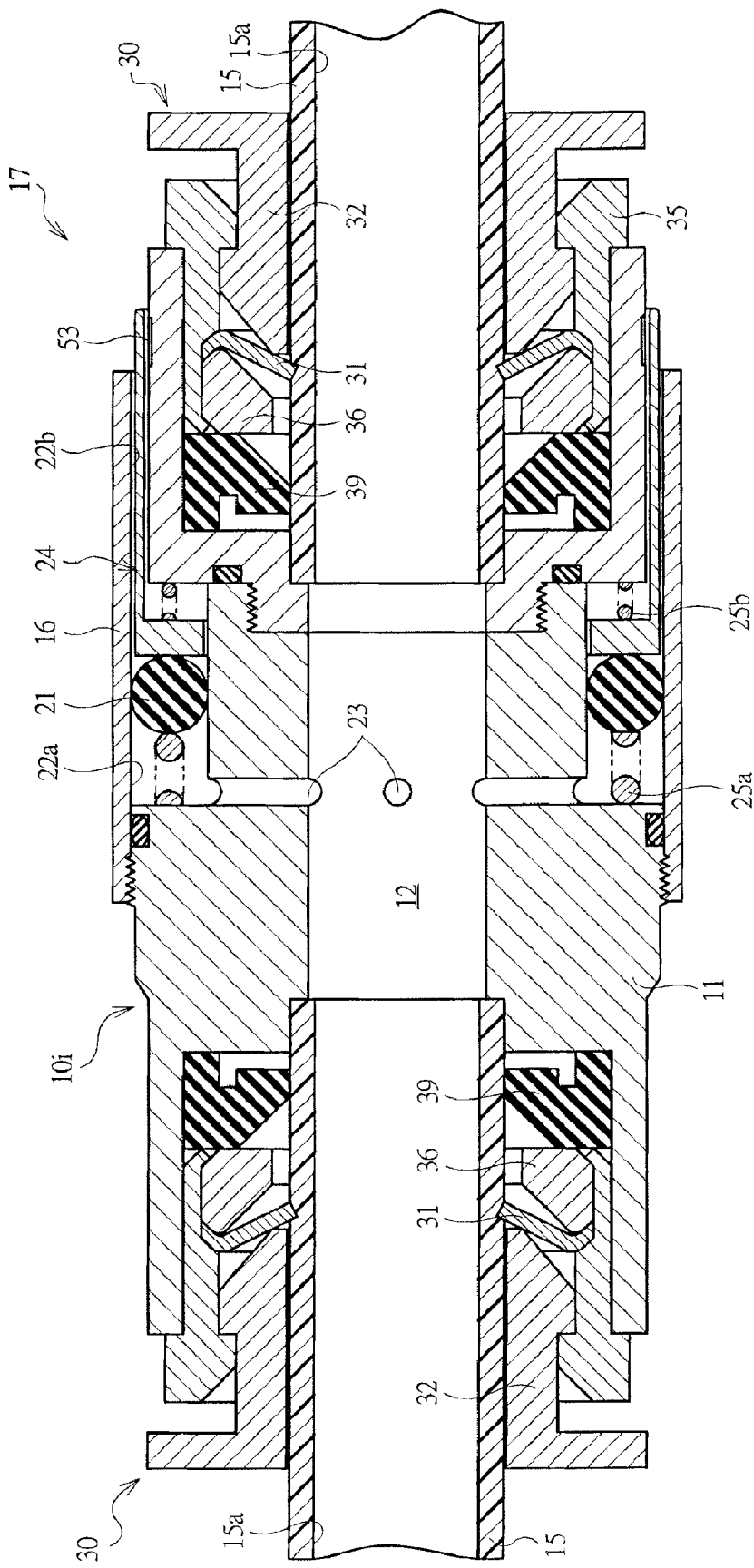
FIG. 15 is a sectional view showing a pipe joint to which the pressure state indicator of the present invention is applied.

FIG. 15 is a sectional view showing a pipe joint to which the pressure state indicator is applied. In this pipe joint 10i, the accommodation space 19 is divided into the pressure chamber 22a and the atmospheric pressure chamber 22b by the sliding sealing member 21, and the sliding sleeve 24 is incorporated in the atmospheric pressure chamber 22b. The indicating portion 53 is provided on the outer peripheral face of the joint main body 11. When positive pressure fluid is supplied to the pressure chamber 22a and the pressure chamber 22a turns into the atmospheric pressure, the indicating portion 53 is covered with the sliding sleeve 24. Also, when the pressure chamber 22a turns into a negative pressure, the sliding sleeve 24 enters the partition member 16 and the indicating portion 53 is exposed to the outside.

Figure 16:
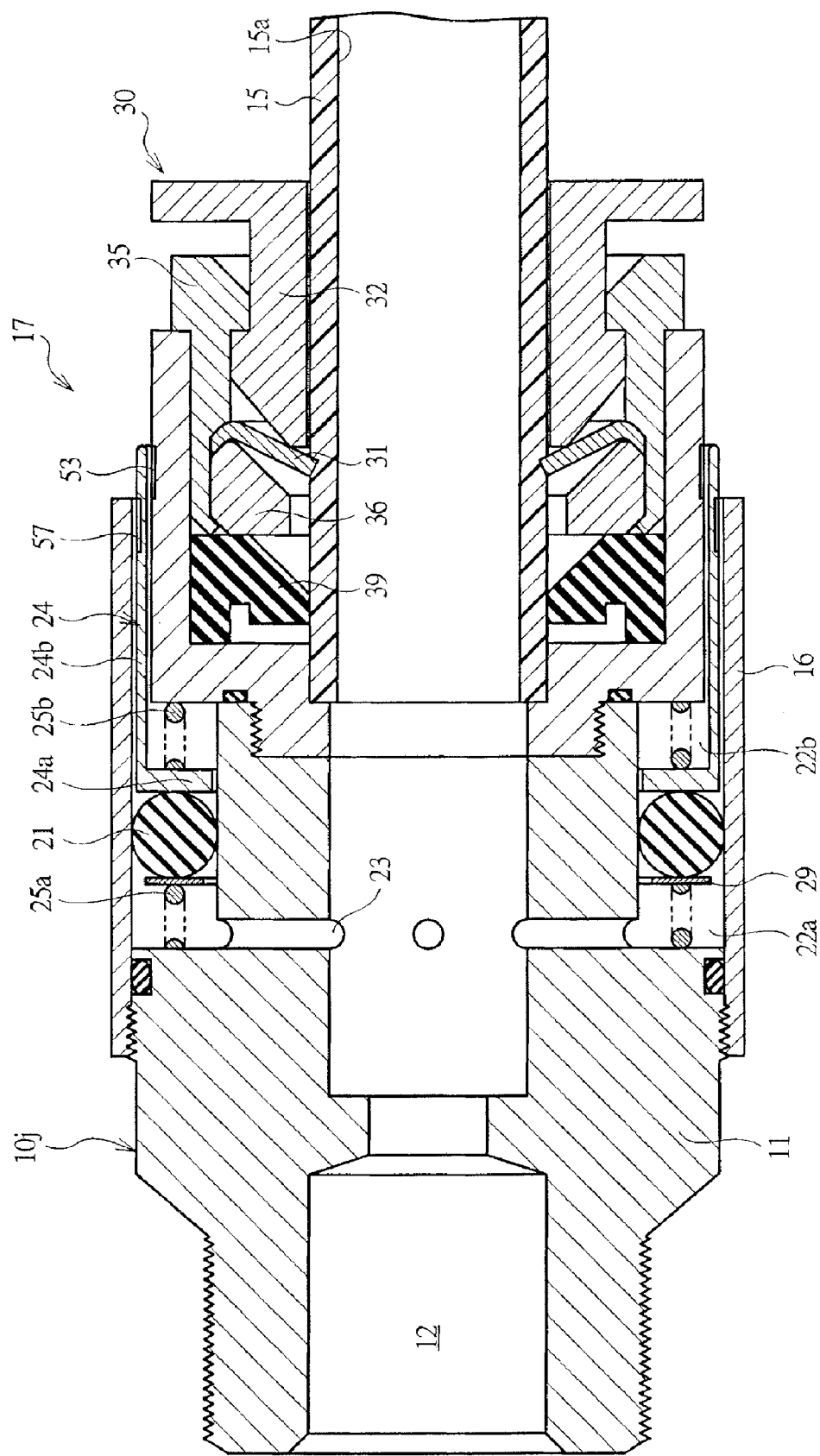
FIG. 16 is a sectional view showing a pipe joint to which the pressure state indicator of the present invention is applied.

In the pipe joint 10j shown in FIG. 16, the indicating portion 53 is provided on the outer peripheral face of the joint main body 11 like in the pipe joint 10i shown in FIG. 15, and the colored exposed portion 57 is provided to the sliding sleeve 24. In this pipe joint 10j, when neither positive pressure fluid nor negative pressure fluid is supplied to the pressure chamber 22a, the sliding sleeve 24 is located at a neutral position or rest position as shown in FIG. 16, and the indicating portion 53 is covered with the sliding sleeve 24 and the exposed portion 57 is covered with the partition member 16 and not exposed to the outside.

When positive pressure fluid is supplied to the pressure chamber 22a, the sliding sealing member 21 moves in a direction of expanding the pressure chamber 22a together with the sliding sleeve 24, and the exposed portion 57 is exposed to the outside of the partition member 16. Consequently, it is observed from outside that positive pressure fluid is supplied into the fluid path 12. Contrary to this, when negative pressure fluid is supplied to the pressure chamber 22a, the sliding sealing member 21 moves in a direction of contracting the pressure chamber 22a together with the sliding sleeve 24, and the exposed portion 57 enters the partition member 16 and the indicating portion 53 is exposed to the outside. Consequently, it is observed from outside that negative pressure fluid is supplied into the fluid path 12.

Figure 17:
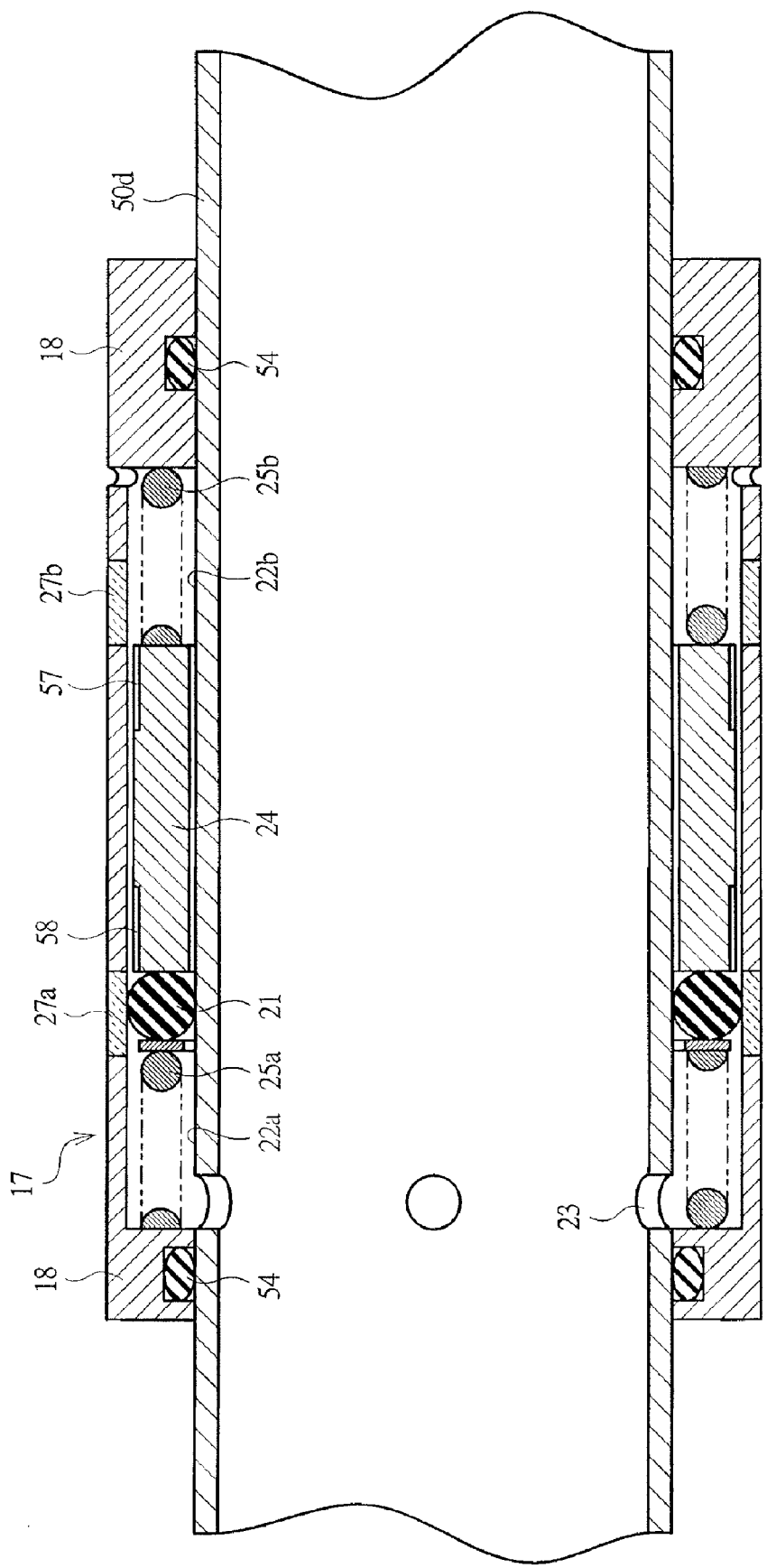
FIG. 17 is a sectional view showing a fluid pipe to which the pressure state indicator of the present invention is applied.
Figure 18:
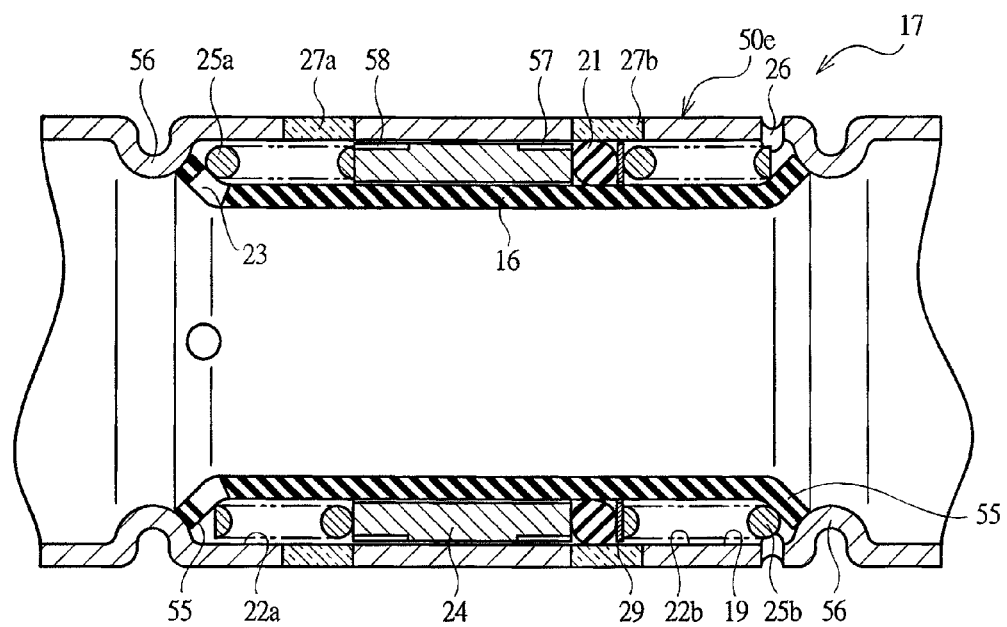
FIG. 18 is a sectional view showing a fluid pipe to which the pressure state indicator of the present invention is applied.

FIG. 17 and FIG. 18 are sectional views each showing a fluid pipe to which the pressure state indicator is applied. Respective fluid pipes 50d and 50e are applied to both a fluid pressure circuit to which positive pressure fluid is supplied and a fluid pressure circuit to which negative pressure is supplied.

In the fluid pipe 50d, the fixing portion 18 is provided on each of both ends of the partition member 16 like in the fluid pipe 50b, and the fluid guide member 17 is constituted of the partition member 16 and the fluid pipe 50d. The accommodation space 19 is divided into the pressure chamber 22a and the atmospheric pressure chamber 22h by the sliding sealing member 21, and the sliding sleeve 24 is mounted movably in the axial direction in the atmospheric pressure chamber 22b. The exposed portion 58 which is located at a position of the transparent member 27a when negative pressure fluid is supplied to the pressure chamber 22a is provided at one end portion of the sliding sleeve 24, and the exposed portion 57 which is located at a position of the transparent member 27b when positive pressure fluid is supplied to the pressure chamber 22a is provided at the other end portion of the sliding sleeve 24.

In the fluid pipe 50e, the partition member 16 is incorporated in its interior like in the fluid pipe 50c shown in FIG. 13, and the sliding sealing member 21 is incorporated in the accommodation space 19 formed between the outer face of the partition member 16 and the fluid pipe 50e. The accommodation space 19 is divided into the pressure chamber 22a and the atmospheric pressure chamber 22b by this sliding sealing member 21. The exposed portion 58 which is located at a position of the transparent member 27a when negative pressure fluid is supplied to the pressure chamber 22a is provided at one end portion of the sliding sleeve 24, and the exposed portion 57 which is located at a position of the transparent member 27b when positive pressure fluid is supplied to the pressure chamber 22a is provided at the other end portion of the sliding sleeve 24.

As described above, the pressure state indicator shown in FIG. 14 to FIG. 18 is applied to both a fluid pressure circuit to which positive pressure fluid is supplied and a fluid pressure circuit to which negative pressure fluid is supplied. If it is applied to the fluid pressure circuit to which positive pressure fluid is supplied, it is used to indicate whether or not positive pressure fluid is supplied therein. Further, if it is applied to the fluid pressure circuit to which negative pressure fluid is supplied, it is used to indicate whether or not the negative pressure fluid is supplied therein.

As a type of a pressure state indicator which is applied to both the fluid pressure circuit to which positive pressure fluid is supplied and the fluid pressure circuit to which negative pressure fluid is supplied as shown in FIG. 14 to FIG. 18, the type in which a pressure state in the fluid path 12 is indicated by a position of only the sliding sealing member 21 without incorporating the sliding sleeve 24 in the accommodation space 19 as shown in FIG. 7B to FIG. 7D and FIG. 12 and FIG. 13 is also available. In this case, a transparent member is provided to the fluid guide member 17 so that it can be observed from outside that the sliding sealing member 21 is located at the negative pressure supply position, and further, a transparent member is provided to the fluid guide member 17 so that it can be observed from outside that the sliding sealing member 21 is located at the positive pressure supply position.

The present invention is not restricted to the foregoing embodiments and various modifications and alterations can be made within the scope of the present invention. For example, although the case where compressed air is supplied as positive pressure fluid to the fluid path 12 has been described and the case where vacuum is supplied as negative pressure fluid has been described, the present invention can be applied also to the case of guiding the liquid.

INDUSTRIAL APPLICABILITY

The pressure state indicator according to the present invention is utilized to externally indicate whether or not any fluid flows in a fluid pressure circuit which employs fluid such as compressed air and negative pressure air as working medium.

The invention claimed is:

1. A pressure state indicator for indicating whether or not positive pressure fluid is supplied to a fluid path, comprising:
a fluid guide member in which the fluid path is formed and which has an accommodation space extending in an axial direction formed outside the fluid path;
a sliding sealing member which is incorporated movably in the axial direction in the accommodation space and partitions the accommodation space into a pressure chamber communicating with the fluid path and an atmospheric pressure chamber communicating with outside;
a spring member which is provided in the atmospheric pressure chamber of the fluid guide member, positions the sliding sealing member at a non-supply position when no positive pressure fluid is supplied to the fluid path, and moves the sliding sealing member to a pressure supply position when positive pressure fluid is supplied to the pressure chamber from the fluid path;
a sliding sleeve incorporated into the accommodation space, moving together with the sliding sealing member, entering the accommodation space when the sliding sealing member is located at the non-supply position, and projecting from the accommodation space when the sliding sealing member is located at the pressure supply position; and
a transparent member provided in the fluid guide member, and externally indicating the sliding sleeve when the sliding sleeve is located at the pressure supply position.

2. The pressure state indicator according to claim 1, wherein the sliding sleeve is provided with indicating portions that are colored in accordance with an axial-directional position, and when the sliding sleeve is located at the pressure supply position, the indicating portions are seen from outside.

3. The pressure state indicator according to claim 1, wherein a fluid pipe is detachably attached to the fluid guide member, and the fluid guide member includes a joint main body in which a fluid path communicating with the fluid path in the fluid pipe is formed and a cylindrical partition member forming the accommodation space with the joint main body.

4. The pressure state indicator according to claim 1, wherein the fluid guide member includes a fluid pipe having a fluid path and a cylindrical partition member which is mounted outside the fluid pipe to form the accommodation space with the fluid pipe.

5. The pressure state indicator according to claim 1, wherein the fluid guide member includes a fluid pipe having a fluid path and a cylindrical partition member which is mounted inside the fluid pipe to form the accommodation space with the fluid pipe.

6. A pressure state indicator for indicating whether or not positive pressure fluid is supplied to a fluid path, comprising:
a fluid guide member including a joint main body in which the fluid path is formed;
a cylindrical partition member forming an accommodation space between the partition member and the joint main body, outside the fluid path;
a sliding sealing member axially movably housed in the accommodation space;
a spring member provided in the accommodation space, positioning the sliding sealing member at a non-supply position when no positive pressure fluid is supplied to the fluid path, and permitting the sliding sealing member to move to a pressure supply position when positive pressure fluid is supplied to the pressure chamber from the fluid path; and
an indicating portion provided in the partition member, and externally indicating the sliding sealing member when the sliding sealing member is located at the pressure supply position.

7. The pressure state indicator according to claim 6, wherein the indicating portion is a transparent member or the partition member formed of transparent material.

8. A pressure state indicator for indicating whether or not negative pressure fluid is supplied to a fluid path, comprising:
- a fluid guide member in which the fluid path is formed and which has an accommodation space extending in an axial direction formed outside the fluid path;
- a sliding member which is incorporated movably in the axial direction in the accommodation space and partitions the accommodation space into a pressure chamber communicating with the fluid path and an atmospheric pressure chamber communicating with outside;
- a spring member which is provided in the pressure chamber of the fluid guide member, positions the sliding member at a non-supply position when no negative pressure fluid is supplied to the fluid path, and permits the sliding member to move to a negative pressure supply position when negative pressure fluid is supplied to the pressure chamber from the fluid path; and
- an indicating portion which is provided in the fluid guide member, and indicates that the sliding member is located at the non-supply position in a state where no negative pressure fluid is supplied to the fluid path and that the sliding member is located at the pressure supply position in a state where negative pressure fluid is supplied to the fluid path.

9. The pressure state indicator according to claim 8, wherein a sliding sealing member which partitions the accommodation space into the pressure chamber and the atmospheric pressure chamber and a sliding sleeve which moves together with the sliding sealing member are incorporated in the accommodation space, and the sliding sleeve is projected to outside of the fluid guide member when it is located at the non-supply position and enters the fluid guide member when it is located at the negative pressure supply position.

10. The pressure state indicator according to claim 8, wherein a sliding sealing member which partitions the accommodation space into the pressure chamber and the atmospheric pressure chamber is incorporated in the accommodation space, and the fluid guide member is provided with a transparent member which externally indicates the sliding sealing member when the sliding sealing member is located at the negative pressure supply position.

11. The pressure state indicator according to claim 8, wherein a sliding sealing member which partitions the accommodation space into the pressure chamber and the atmospheric pressure chamber and a sliding sleeve which moves together with the sliding sealing member are incorporated in the accommodation space, and the fluid guide member is provided with a transparent member which externally indicates the sliding sleeve when the sliding sleeve is located at the negative pressure supply position.

12. The pressure state indicator according to claim 8, wherein a fluid pipe is detachably attached to the fluid guide member, and the fluid guide member includes a joint main body in which a fluid path communicating with the fluid path in the fluid pipe is formed and a cylindrical partition member forming the accommodation space with the joint main body.

13. The pressure state indicator according to claim 8, wherein the fluid guide member includes a fluid pipe having a fluid path and a cylindrical partition member which is mounted outside the fluid pipe to form the accommodation space with the fluid pipe.

14. The pressure state indicator according to claim 8, wherein the fluid guide member includes a fluid pipe having a fluid path and a cylindrical partition member which is mounted inside the fluid pipe to form the accommodation space with the fluid pipe.

15. A pressure state indicator for indicating whether or not positive pressure fluid is supplied to a fluid path and whether or not negative pressure fluid is supplied thereto, comprising:
- a fluid guide member in which the fluid path is formed and which has an accommodation space extending in an axial direction formed outside the fluid path;
- a sliding member which is incorporated movably in the axial direction in the accommodation space and partitions the accommodation space into a pressure chamber communicating with the fluid path and an atmospheric pressure chamber communicating with outside;
- first and second spring members which are provided respectively in the pressure and atmospheric pressure chambers so as to position the sliding member at a non-supply position when neither negative pressure fluid nor positive pressure fluid is supplied to the fluid path, move the sliding member to a negative pressure supply position when negative pressure fluid is supplied to the fluid path, and move the sliding member to a positive pressure supply position when positive pressure fluid is supplied to the fluid path; and
- an indicating portion which is provided in the fluid guide member, and indicates whether or not the sliding member is located at the non-supply position in a state where neither negative pressure fluid nor positive pressure fluid is supplied to the fluid path, whether or not the sliding member is located at the negative pressure supply position by negative pressure fluid supplied to the fluid path, and whether or not the sliding member is located at the positive pressure supply position by positive pressure fluid supplied to the fluid path.

16. The pressure state indicator according to claim 15, wherein a sliding sealing member which partitions the accommodation space into the pressure chamber and the atmospheric pressure chamber and a sliding sleeve which moves together with the sliding sealing member are incorporated in the accommodation space, and the sliding sleeve is projected to outside of the fluid guide member when it is located at the non-supply position and the positive pressure supply position and enters the fluid guide member when it is located at the negative pressure supply position.

17. The pressure state indicator according to claim 15, wherein a sliding sealing member which partitions the accommodation space into the pressure chamber and the atmospheric pressure chamber is incorporated in the accommodation space, and the fluid guide member is provided with a first transparent member which externally indicates the sliding sealing member when the sliding sealing member is located at the negative pressure supply position and a second transparent member which externally indicates the sliding sealing member when the sliding sealing member is located at the positive pressure supply position.

18. The pressure state indicator according to claim 15, wherein a sliding sealing member which partitions the accommodation space into the pressure chamber and the atmospheric pressure chamber and a sliding sleeve which moves together with the sliding sealing member are incorporated in the accommodation space, and the fluid guide member is provided with a first transparent member which externally indicates the sliding sleeve when the sliding sleeve is located at the negative pressure supply position and a second transparent member which externally indicates the sliding sleeve when the sliding sleeve is located at the positive pressure supply position.

19. The pressure state indicator according to claim 15, wherein a fluid pipe is detachably attached to the fluid guide member, and the fluid guide member includes a pipe joint main body in which a fluid path communicating with the fluid path in the fluid pipe is formed and a cylindrical partition member forming the accommodation space with the pipe joint main body.

20. The pressure state indicator according to claim 15, wherein the fluid guide member includes a fluid pipe having a fluid path and a cylindrical partition member which is mounted outside the fluid pipe to form the accommodation space with the fluid pipe.

21. The pressure state indicator according to claim 15, wherein the fluid guide member includes a fluid pipe having a fluid path and a cylindrical partition member which is mounted inside the fluid pipe to form the accommodation space with the fluid pipe.

* * * * *